(12) United States Patent
Yoshida et al.

(10) Patent No.: US 11,884,332 B2
(45) Date of Patent: Jan. 30, 2024

(54) AUTOMOBILE HOOD

(71) Applicant: NIPPON STEEL CORPORATION, Tokyo (JP)

(72) Inventors: Tohru Yoshida, Tokyo (JP); Koichi Hamada, Tokyo (JP); Takeshi Kawachi, Tokyo (JP); Atsuo Koga, Tokyo (JP); Takuya Oishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 396 days.

(21) Appl. No.: 17/422,091

(22) PCT Filed: Dec. 27, 2019

(86) PCT No.: PCT/JP2019/051438
§ 371 (c)(1),
(2) Date: Jul. 9, 2021

(87) PCT Pub. No.: WO2020/145201
PCT Pub. Date: Jul. 16, 2020

(65) Prior Publication Data
US 2022/0097774 A1 Mar. 31, 2022

(30) Foreign Application Priority Data
Jan. 10, 2019 (JP) .................. 2019-002995

(51) Int. Cl.
*B62D 25/10* (2006.01)
*B62D 25/12* (2006.01)

(52) U.S. Cl.
CPC ......... *B62D 25/105* (2013.01); *B62D 25/12* (2013.01)

(58) Field of Classification Search
CPC .................................... B62D 25/105
See application file for complete search history.

(56) References Cited

U.S. PATENT DOCUMENTS

| 11,299,084 | B2* | 4/2022 | Alexander | ............. B60P 7/06 |
| 11,685,336 | B1* | 6/2023 | Farooq | ............. B62D 25/12 180/271 |

(Continued)

FOREIGN PATENT DOCUMENTS

| JP | 11-348716 A | 12/1999 |
| JP | 2005-193863 A | 7/2005 |

(Continued)

*Primary Examiner* — Erez Gurari
(74) *Attorney, Agent, or Firm* — Birch, Stewart, Kolasch & Birch, LLP

(57) ABSTRACT

In an automobile hood, sufficient panel rigidity and dent resistance of a panel are secured while achieving weight reduction. An automobile hood having panel, reinforcing member and joint that joins the panel and the reinforcing member such that the reinforcing member includes a structure formed from a plurality of units having hexagonal annular shape disposed in a close-packed arrangement. Floor of the unit has an annular end part. All of annular end part is located between first circle and second circle wherein first circle is inscribed within a first ridge line overlapping with an outer end part of the floor. Second circle is concentric with first circle and has a radius that is 60% of a radius of the first circle. Width of upper face of floor is 2 mm or more over the entire area of the annular end part in the circumferential direction of the annular end part.

7 Claims, 24 Drawing Sheets

(56) References Cited

U.S. PATENT DOCUMENTS

| | | | |
|---|---|---|---|
| 2004/0182616 A1* | 9/2004 | Mason | B62D 25/105 180/69.21 |
| 2012/0298436 A1* | 11/2012 | Ho | B62D 29/005 180/69.2 |
| 2014/0062142 A1* | 3/2014 | Ikeda | B62D 25/12 296/193.11 |
| 2014/0110971 A1* | 4/2014 | Ray | B62D 25/105 296/187.09 |
| 2015/0028624 A1* | 1/2015 | Wisniewski | B62D 25/12 296/187.03 |
| 2015/0353141 A1* | 12/2015 | Yoshida | B62D 27/026 296/193.11 |
| 2016/0096505 A1* | 4/2016 | Ikeda | B62D 29/005 296/193.11 |
| 2016/0251033 A1* | 9/2016 | Kolar, Jr. | B62D 27/023 296/193.11 |
| 2017/0232925 A1* | 8/2017 | Barbat | B60R 21/36 280/734 |
| 2017/0282978 A1* | 10/2017 | Yoshida | B62D 25/105 |
| 2019/0016393 A1* | 1/2019 | Patel | B32B 5/028 |
| 2019/0337259 A1* | 11/2019 | Shirakami | B32B 15/08 |
| 2020/0391805 A1* | 12/2020 | Kashima | E05B 85/045 |
| 2021/0016839 A1* | 1/2021 | Lein | B62D 29/005 |
| 2021/0071690 A1* | 3/2021 | Alexander | F15B 15/10 |
| 2021/0300479 A1* | 9/2021 | Onaka | B62D 25/10 |
| 2021/0347414 A1* | 11/2021 | Winkler | B60R 21/34 |
| 2022/0097773 A1* | 3/2022 | Yoshida | B62D 25/105 |
| 2022/0097774 A1* | 3/2022 | Yoshida | B60R 21/34 |
| 2022/0274150 A1* | 9/2022 | Yamazaki | B21D 22/22 |
| 2023/0112540 A1* | 4/2023 | Nishimura | B62D 25/105 296/187.04 |
| 2023/0117169 A1* | 4/2023 | Ishizuka | B62D 25/105 180/69.2 |
| 2023/0192001 A1* | 6/2023 | Mellergård | B60R 5/045 296/37.1 |

FOREIGN PATENT DOCUMENTS

| | | |
|---|---|---|
| JP | 2006-224876 A | 8/2006 |
| JP | 3982061 B2 | 9/2007 |
| JP | 4763417 B2 | 8/2011 |
| JP | 2017-1553 A | 1/2017 |
| KR | 0135009 Y1 | 1/1999 |

* cited by examiner

CASE WHERE MAXIMUM SUPPORT SPAN SP IS TOO LONG

CASE WHERE MAXIMUM SUPPORT SPAN SP IS APPROPRIATE

CASE WHERE MAXIMUM SUPPORT SPAN SP IS TOO SHORT

FIRST OUT-OF-RANGE EXAMPLE

SECOND OUT-OF-RANGE EXAMPLE

FIRST MODIFICATION

FIRST MODIFICATION

SECOND MODIFICATION

SECOND MODIFICATION

THIRD MODIFICATION

FOURTH MODIFICATION

FIFTH MODIFICATION

SHAPE E (PRESENT DISCLOSURE EXAMPLE 4)

SHAPE G (COMPARATIVE EXAMPLE 2)

SHAPE F (PRESENT DISCLOSURE EXAMPLE 5)

SHAPE H (COMPARATIVE EXAMPLE 3)

SHAPE I (PRESENT DISCLOSURE EXAMPLE 6)

SHAPE J (PRESENT DISCLOSURE EXAMPLE 7)

SHAPE K (COMPARATIVE EXAMPLE 4)

AUTOMOBILE HOOD

TECHNICAL FIELD

The present disclosure relates to an automobile hood.

BACKGROUND ART

Automobile hoods are known (for example, see Patent Documents 1 and 2).

Patent Document 1 discloses a hood panel structure for a vehicle. The principal purpose of the hood panel structure is to reduce the degree of injury to a pedestrian if the pedestrian collides with the hood panel.

Patent Document 2 discloses a hood for an automobile as exterior equipment for an automobile. The principal purpose of the hood for an automobile is to absorb the energy of contact when a pedestrian comes into contact with the hood for an automobile, by only deforming by a small amount in the inward direction of the automobile.

LIST OF PRIOR ART DOCUMENTS

Patent Document

Patent Document 1: JP2005-193863A
Patent Document 2: JP2017-1553A

SUMMARY OF INVENTION

Technical Problem

There is a demand for the weight of automobile hoods to be reduced further and also for the panel rigidity and the dent resistance of automobile hoods to be improved. However, for example, if a panel of an automobile hood made of a steel sheet is made thinner than 0.6 mm in order to reduce the weight, both the panel rigidity and the dent resistance will decrease to an extent that cannot be ignored.

Patent Document 1 and Patent Document 2 do not disclose any matters regarding problems or structures from the viewpoint of securing both sufficient panel rigidity and sufficient dent resistance while achieving a weight reduction.

One objective of the present disclosure is, with respect to an automobile hood, to secure sufficient panel rigidity and dent resistance of a panel while achieving a weight reduction.

Solution to Problem

The gist of the present disclosure is an automobile hood which is described hereunder.

An automobile hood, including:
a panel,
a reinforcing member, and
a joint that joins together the panel and the reinforcing member,
wherein:
the reinforcing member includes a structure formed from a plurality of units having a hexagonal annular shape disposed in a close-packed arrangement;
the unit has a floor, an inclined wall, and a top plate;
the floor is adjacent to the panel;
the top plate and the panel are separated from each other;
the inclined wall is between the floor and the top plate;
a hexagonal annular ridge line of the unit is between the floor and the inclined wall;
the floor has an annular end part which is centered on a center of the annular unit;
all of the end part is between a first circle which is inscribed within the ridge line, and a second circle which is concentric with the first circle and which has a radius that is 60% of a radius of the first circle;
the floor includes a floor surface as a face which faces the panel; and
a width of the floor surface is 2 mm or more over an entire area of the annular end part in a circumferential direction of the annular end part.

(2) The automobile hood according to the above (1), wherein a distance between a corner of the hexagonal ridge line and the annular end part is greater than a distance between a center of one side of the ridge line and the annular end part.

(3) The automobile hood according to the above (1) or (2), wherein the end part is circular.

(4) The automobile hood according to the above (1) or (2), wherein the end part is hexagonal.

(5) The automobile hood according to the above (1) or (2), wherein the end part is dodecagonal.

(6) The automobile hood according to any one of the above (1) to (5), wherein:
the panel is a steel sheet, and
a sheet thickness of the panel is within a range of 0.35 mm to 0.60 mm.

(7) The automobile hood according to any one of the above (1) to (5), wherein:
the panel is an aluminum alloy sheet, and
a sheet thickness of the panel is within a range of 0.50 mm to 1.00 mm.

Advantageous Effects of Invention

According to the present disclosure, in an automobile hood, sufficient panel rigidity and dent resistance of a panel can be secured while achieving a weight reduction.

DESCRIPTION OF EMBODIMENTS

Figure 1:
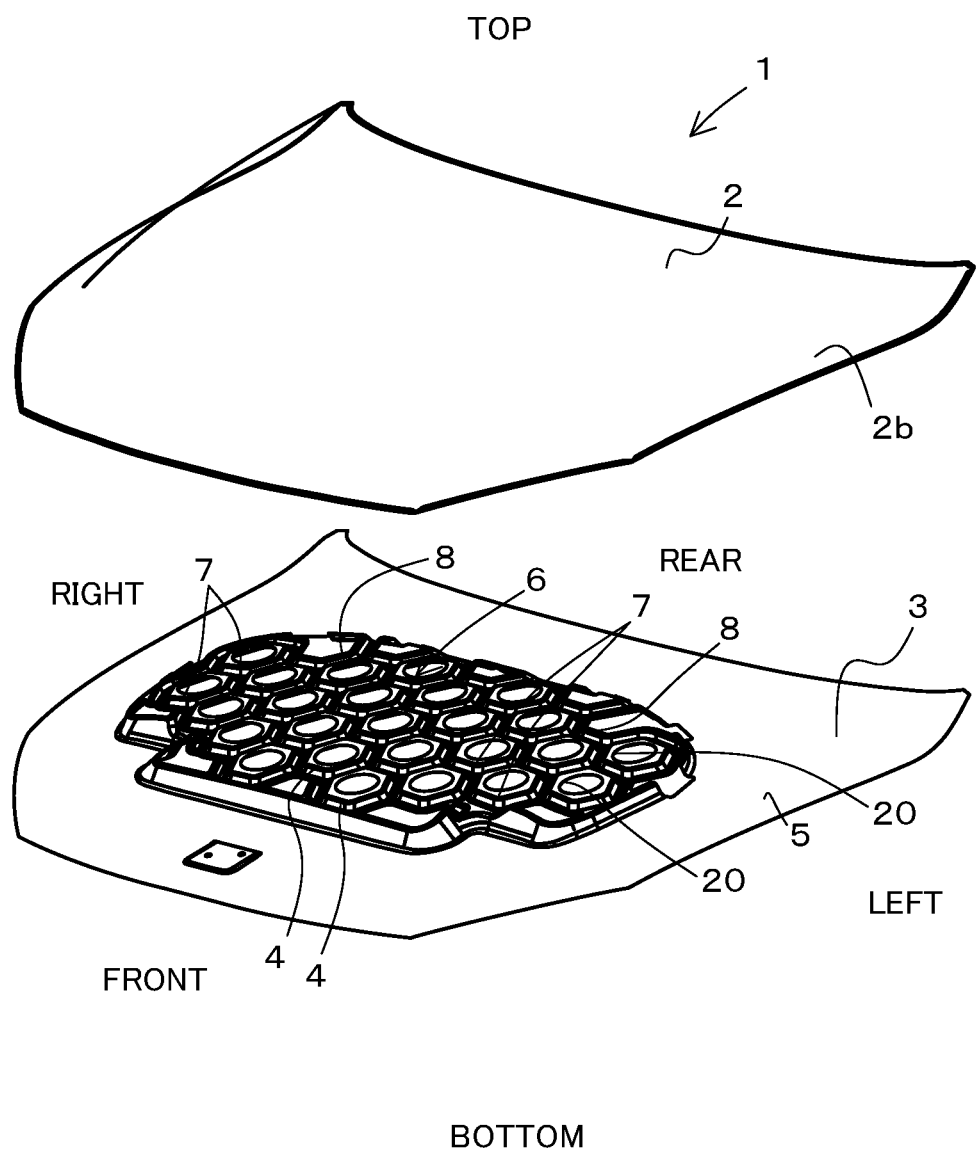
FIG. 1 is a schematic exploded perspective view of an automobile hood according to one embodiment of the present disclosure.

Hereunder, first, the circumstances leading to the conception of the present disclosure will be described, and then an embodiment will be described in detail.

[Circumstances Leading to Conception of Present Disclosure]

In the present description, the term "panel rigidity" refers to, in a case where a force from outside acts on a press-formed product, for example, a panel on the outer side of an automobile hood, which has a comparatively moderately curving surface and in which the surface area is extremely large relative to the sheet thickness, the rigidity of the panel in question. The panel rigidity corresponds to a feeling of elastic resistance or a sensation of deflection deformation when the panel is pressed with a hand. This characteristic is usually represented by the deflection when a load is applied, and the smaller the deflection is when a constant load is applied, the higher the panel rigidity is.

In the present description, the term "dent resistance" refers to the difficulty for an indentation (dent) to be left after removing the load in a case where a localized load is applied to a panel for some reason. In the case of the body of an actual automobile, such dents occur when an outer panel of a door or the like is strongly pressed with a finger or the palm of a hand, or when the automobile body is hit by a flying stone while travelling and the like. A dent is formed as a result of a place on the panel at which a load has been applied plastically deforming. Therefore, when the strain on the panel at a time that a load is applied thereto reaches a certain magnitude, the strain remains even after the load is removed, resulting in a dent. The minimum value of a load that causes a certain residual strain in the panel is referred to as the "dent load", and the larger the dent load is, the better the dent resistance is.

In an automobile hood, the thinner the sheet thickness of a panel is made, the more both the panel rigidity and the dent resistance decrease. Further, with regard to automobile hoods, it cannot be said that conventionally improvements have been made mainly from the viewpoint of sufficiently securing both panel rigidity and dent resistance while achieving a weight reduction.

Weight reduction, panel rigidity and dent resistance will now be described more specifically. First, the definition of panel rigidity is as described above. That is, the term "panel rigidity" refers to the degree of inflexibility of a panel. For example, when a panel of an automobile hood is pressed with a hand, it is difficult for the panel to deflect if the panel rigidity is high. The definition of dent resistance is also as described above. That is, the term "dent resistance" refers to the degree to which it is difficult to form a dent flaw. For example, when a pebble hits a panel, if the dent resistance is low, a dent flaw will be easily formed in the panel.

In recent years, in order to reduce the weight of automobiles, the strength of members constituting the automobiles is being increased. In general, if the strength (tensile strength) of a member is increased, the walls of the member can be made thinner. It is considered that, as a result, the weight of the member can be reduced. However, it is not the case that such kind of weight reduction achieved by increasing the strength simply holds true for an exterior material such as a panel of an automobile. This is because the panel rigidity and the dent resistance which are required for an exterior material of an automobile are not determined only by the strength of the exterior material.

The aforementioned occurrence of deflection in which the panel rigidity in an outer panel of an automobile hood is reflected depends mainly on the modulus of elasticity and sheet thickness of the panel. Further, with respect to steel sheets, there is no difference in the value of the Young's modulus between a low-strength material and a high-strength material. Therefore, even if a low-strength material is simply replaced with a high-strength material, the panel rigidity does not improve. On the other hand, when a low-strength material is replaced with a high-strength material, the dent resistance that is one kind of resistance to plastic deformation improves. However, the influence which the steel material strength has on the dent resistance is much less than the influence which the sheet thickness of the panel has on the dent resistance. Hence, even if a low-strength material is simply replaced with a high-strength material, a significant improvement in the dent resistance cannot be expected.

Further, with respect to the relation between the panel rigidity and dent resistance of the panel and the sheet thickness of the panel, as described above, when the panel is made thinner, both the panel rigidity and the dent resistance decrease. Consequently, there is a limit to the amount of weight reduction that can be achieved while securing the panel rigidity and the dent resistance. The thickness of a panel that is considered to be such a limit is around 0.65 mm in the case of a panel made of a steel sheet. However, it is desired to make such automobile panels thinner than 0.65 mm in order to reduce the weight.

However, at the present time, the sheet thickness of panels is not being made thinner than 0.65 mm. This is because the thinner the sheet thickness of a panel is made, the greater the deflection of the panel will be when the panel is touched with a hand in order to perform waxing or the like. In other words, it is because a high-quality feeling will no longer be felt from the automobile. On the other hand, in order to suppress such kind of deflection and reduce the degree of injury to a pedestrian at the time of a collision, attachment of a reinforcing member to a panel on a side which is on the inner surface side of a vehicle has been performed up to now.

In order to improve the panel rigidity of a panel using a reinforcing member, it is preferable to increase the rigidity of the reinforcing member. However, if the sheet thickness of a reinforcing member is increased in order to increase the rigidity of the reinforcing member, the reinforcing member will become heavy, which is not preferable for reducing the weight of the automobile hood. Further, it is not necessarily the case that the dent resistance will be improved even if the rigidity of the reinforcing member is increased. Because of the existence of such problems, even when a reinforcing member is simply used, it is difficult to secure both panel rigidity and dent resistance while also reducing the weight of the automobile hood.

As the result of diligent research, the inventors of the present application came to pay attention to the aforementioned problems, and conducted additional diligent research. The inventors of the present application then conceived of adopting a honeycomb structure as a reinforcing member of an automobile hood, in consideration of the balance between strength and weight. However, simply adopting a honeycomb structure is insufficient for securing both high panel rigidity and high dent resistance. This is because the shorter the length of one side is in a hexagonal annular unit constituting the honeycomb structure, the shorter the support span of the panel can be made, which is preferable for improving the panel rigidity. On the other hand, the shorter that the aforementioned length of one side is, the smaller the tolerance of the elastic deflection of the panel will be, and hence the more the dent resistance will decrease. In addition, the shorter the length of one side is, the higher the mass density of the reinforcing member will be, and the heavier the reinforcing member will become. By continuing to conduct diligent research even after conceiving of forming a reinforcing member with a honeycomb structure, the inventors of the present application obtained the aforementioned findings for the first time. Subsequently, based on these findings, the inventors of the present application conceived of a structure which satisfies all of the requirements with respect to weight reduction, securing panel rigidity, and securing dent resistance. That is, the inventors of the present application arrived at the present disclosure, for which one example is described hereunder.

Description of Embodiment

Hereunder, an embodiment of the present disclosure is described while referring to the accompanying drawings.

Figure 2:
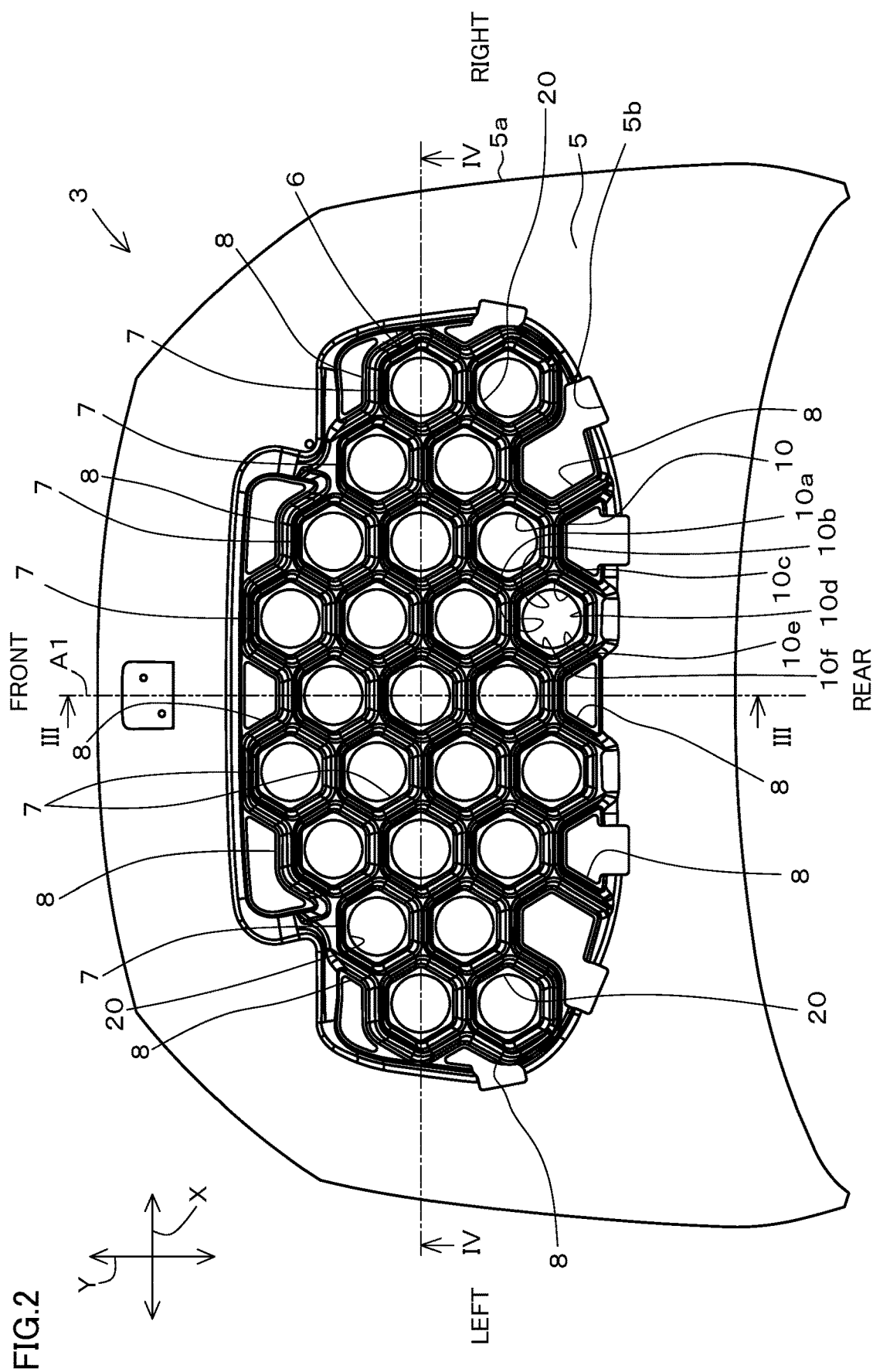
FIG. 2 is a plan view of a reinforcing member of the automobile hood.
Figure 3:
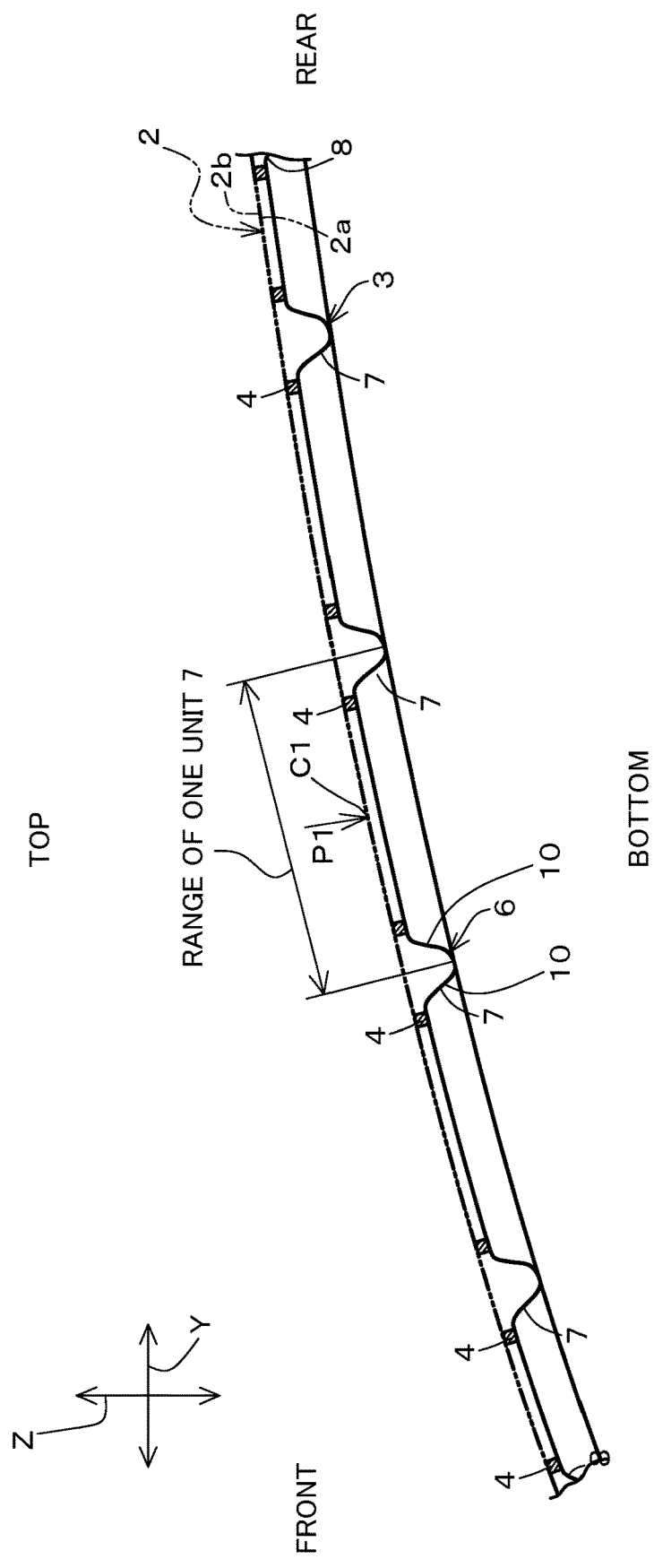
FIG. 3 is a schematic cross-sectional view along a line III-III in FIG. 2.
Figure 4:
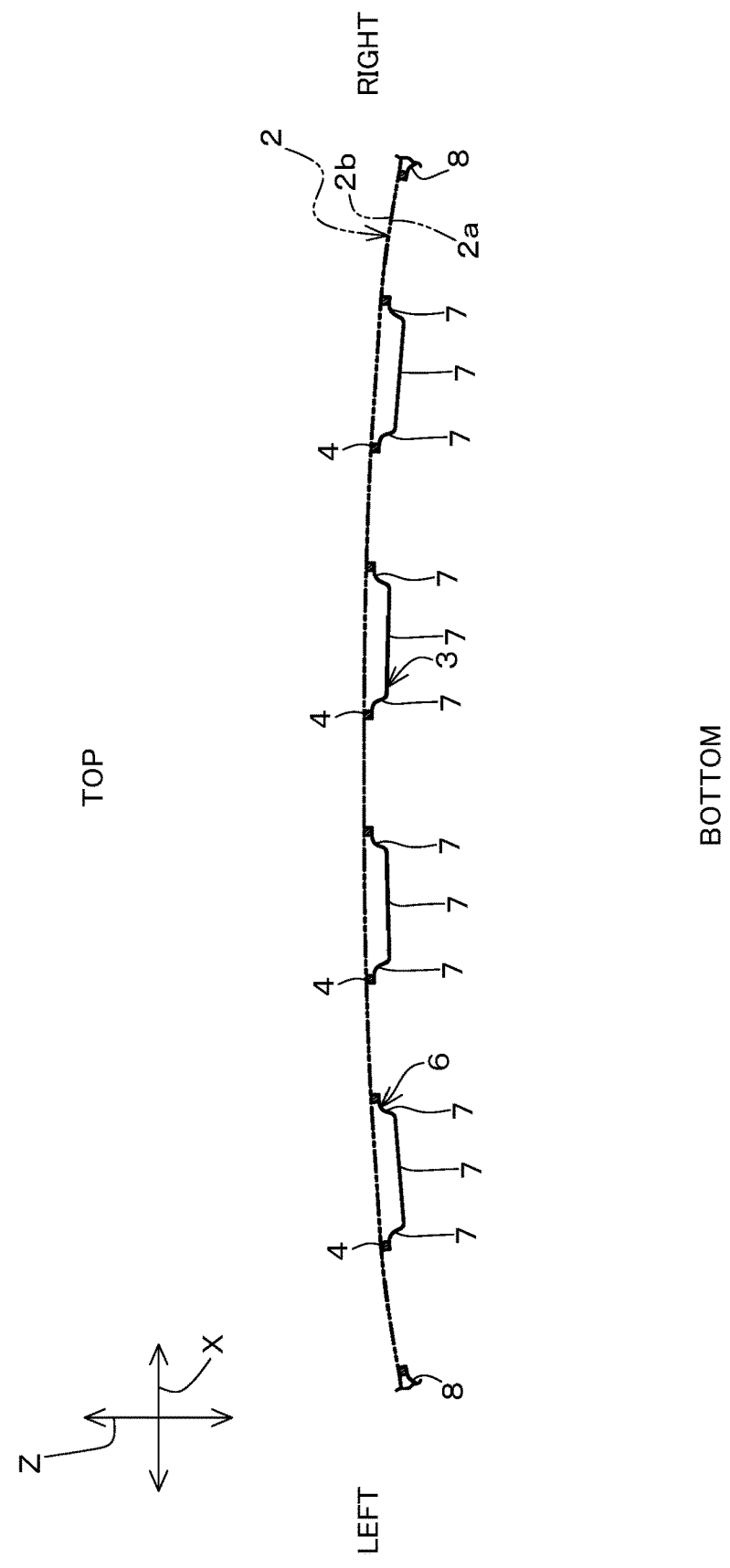
FIG. 4 is a cross-sectional view along a line IV-IV in FIG. 2, in which illustration of a portion that appears to the rear of the cross-section is omitted.

FIG. 1 is a schematic exploded perspective view of an automobile hood 1 according to one embodiment of the present disclosure. FIG. 2 is a plan view of a reinforcing member 3 of the automobile hood 1. FIG. 3 is a schematic cross-sectional view along a line in FIG. 2. FIG. 4 is a cross-sectional view along a line IV-IV in FIG. 2, in which illustration of a portion that appears to the rear of the cross-section is omitted. Note that, in FIG. 3 and FIG. 4, a panel 2 that does not appear in FIG. 2 is indicated by a chain double-dashed line that is a virtual line.

Figure 5:
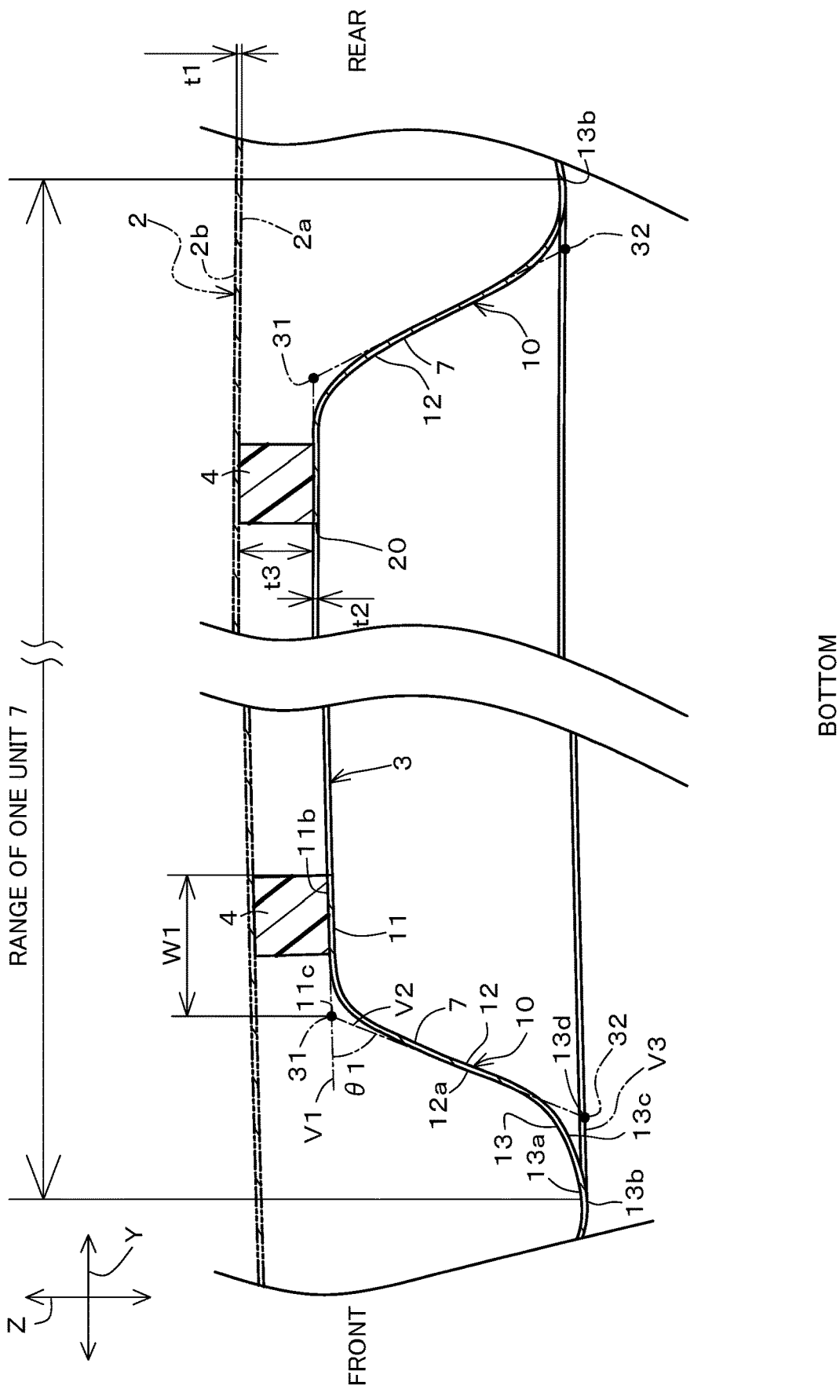
FIG. 5 is a view in which one part of FIG. 3 is enlarged.
Figure 6:
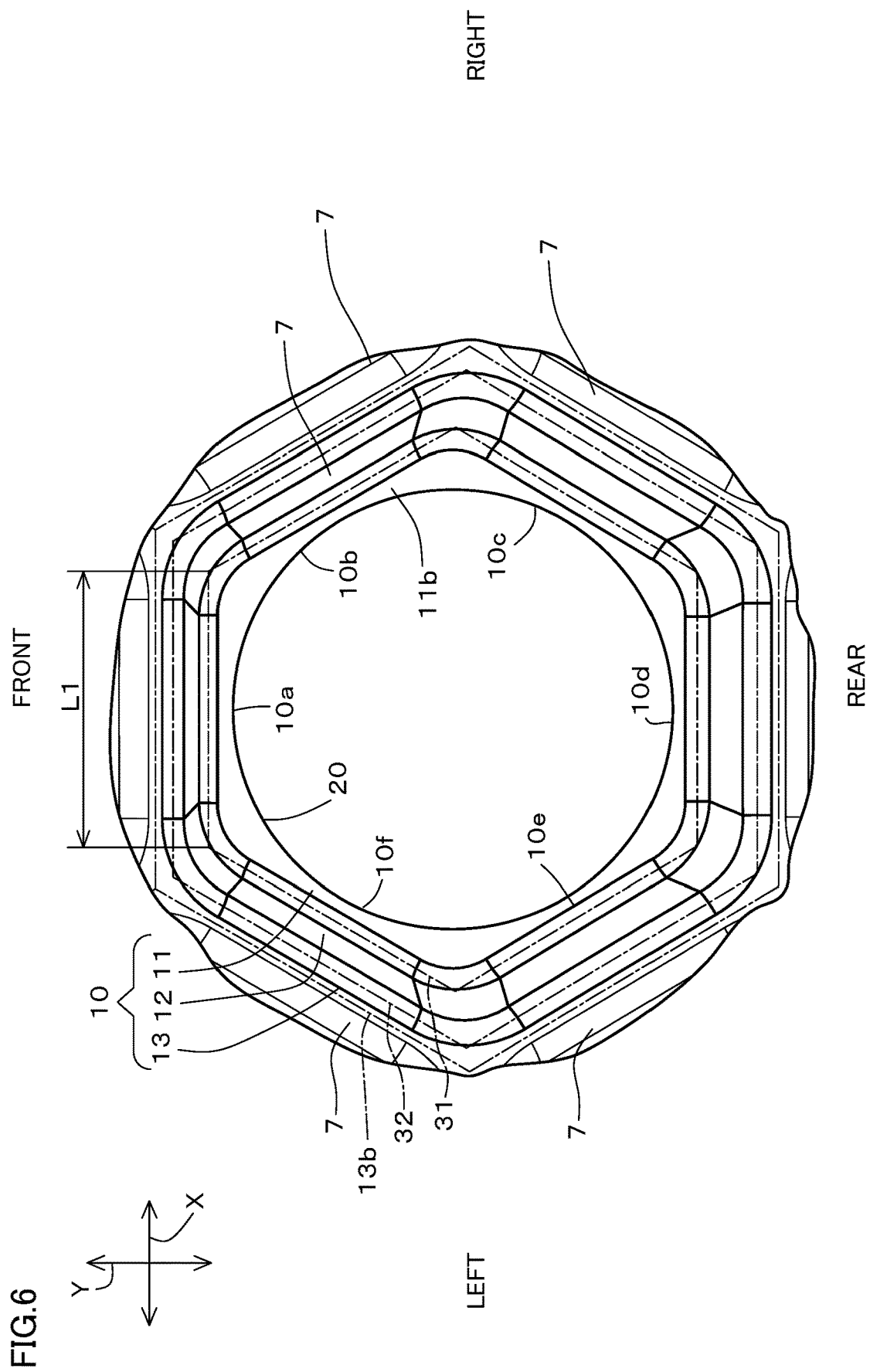
FIG. 6 is a plan view in which the circumference of one unit of the automobile hood is enlarged.
Figure 7A:
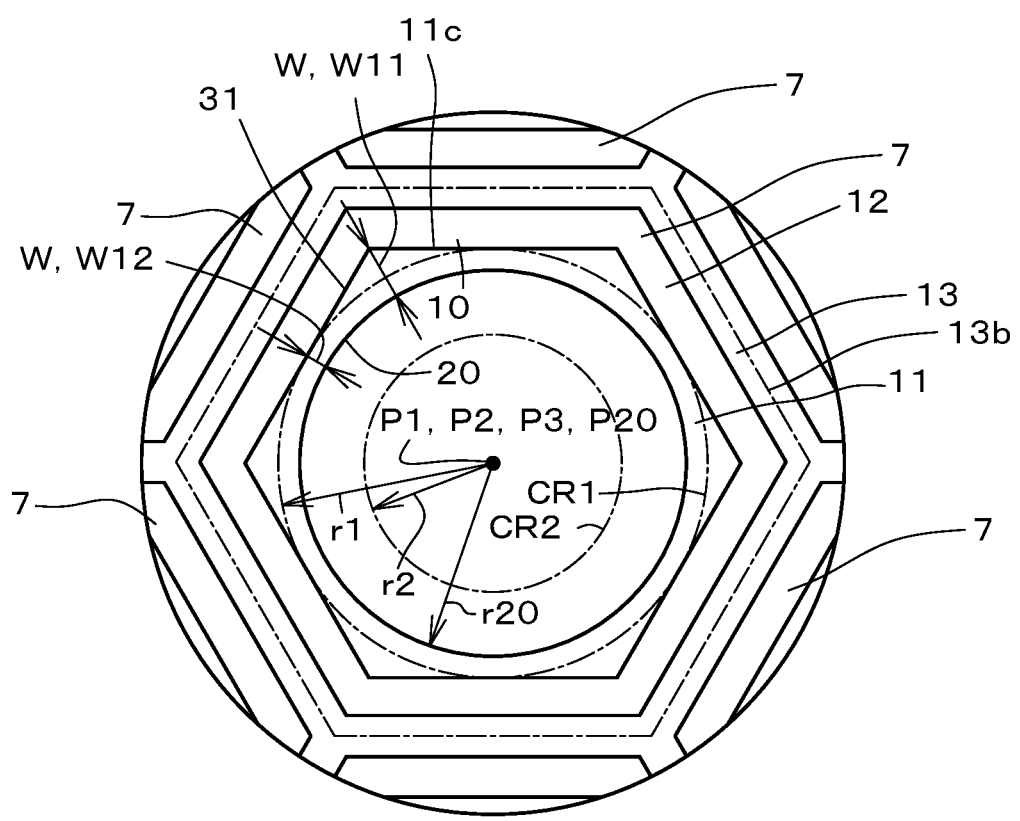
FIG. 7A is a view illustrating, in a simplified form, the circumference of one unit that is illustrated in FIG. 6.
Figure 7B:
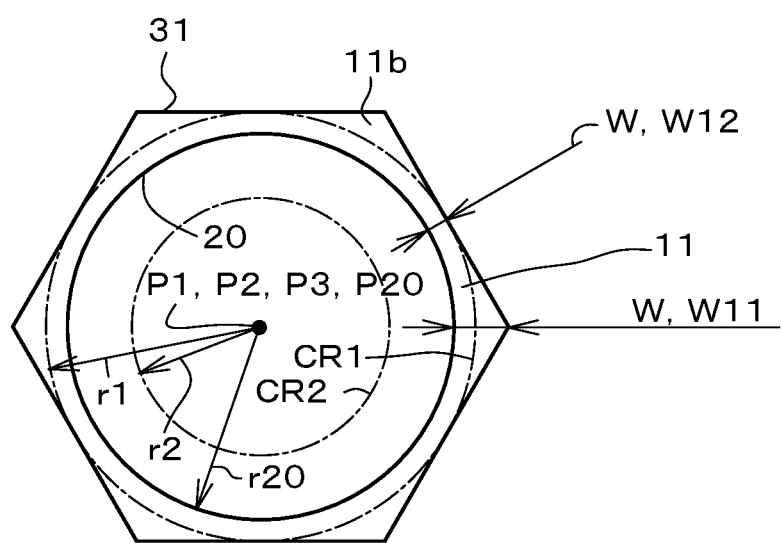
FIG. 7B is a view illustrating one portion extracted from FIG. 7A.

FIG. 5 is a view in which one part of FIG. 3 is enlarged. FIG. 6 is a plan view in which the circumference of one unit 7 of the automobile hood 1 is enlarged. In FIG. 6, units 7 that are other than a single unit 7 at the center are illustrated using thinner lines than the central unit 7 so as to be easily distinguished from the central unit 7. FIG. 7A is a view illustrating, in a simplified form, the single unit 7 illustrated in FIG. 6. FIG. 7B is a view illustrating one portion extracted from FIG. 7A. Hereinafter, unless otherwise specified, the embodiment will be described with reference to FIG. 1 to FIG. 7B as appropriate.

The automobile hood 1 is a front hood provided at the front part of an automobile, and is also called a "bonnet". An automobile in which the automobile hood 1 is provided is, for example, a passenger vehicle. A sedan-type passenger vehicle, a coupe-type passenger vehicle, a hatchback-type passenger vehicle, a minivan-type passenger vehicle, an SUV (Sport Utility Vehicle) type passenger vehicle, and the like can be mentioned as examples of the passenger vehicle.

Note that, in the present description, the terms "front", "rear", "left", "right", and "upper" and "lower" are used taking a time when the automobile hood 1 is mounted to an automobile and the automobile hood 1 is closed as the basis. The term "front" refers to the direction in which the automobile advances. The term "rear" refers to the direction in which the automobile reverses. The term "right" refers to the turning direction of the automobile when the automobile which is advancing turns to the right. The term "left" refers to the turning direction of the automobile when the automobile which is advancing turns to the left. Further, in the present embodiment, the vehicle width direction of the automobile to which the automobile hood 1 is mounted is referred to as "vehicle width direction X". Further, the vehicle length direction of the automobile to which the automobile hood 1 is mounted is referred to as "vehicle length direction Y". Furthermore, the vehicle height direction of the automobile to which the automobile hood 1 is mounted is referred to as "vehicle height direction Z".

The automobile hood 1 has a panel 2, a reinforcing member 3, and a joint 4 that joins together the panel 2 and the reinforcing member 3.

In the automobile hood 1, the panel 2 is a portion that constitutes a part of the outer surface of the automobile. The panel 2 is formed of, for example, a metal material such as a mild steel sheet or a high-tensile strength steel sheet. As an example of the high-tensile strength steel sheet, a steel sheet having a tensile strength of 340 MPa or more can be mentioned, and a steel sheet having a tensile strength within a range of 440 MPa to 590 MPa can be mentioned as a preferable example. The panel 2 is formed, for example, by subjecting a single steel sheet to press working or the like. A sheet thickness t1 of the panel 2 (thickness of the steel sheet) is set to 0.60 mm or less, preferably is set to 0.50 mm or less, and more preferably is set to 0.40 mm or less. The lower limit of the sheet thickness t1 of the panel 2 is preferably 0.35 mm. The sheet thickness t1 of the panel 2 is, for example, within the range of 0.35 mm to 0.60 mm. The thinner the sheet thickness of the panel 2 is made in this way, the lighter the automobile hood 1 can be made.

The panel 2 may be an aluminum alloy sheet. In this case, the sheet thickness of the panel 2 is set so as to obtain equivalent values from the viewpoint of panel rigidity and dent resistance with respect to the sheet thickness of the panel 2 that is made of a steel sheet. More specifically, the panel rigidity depends on the Young's modulus of the material and the sheet thickness. Further, the dent resistance depends on the yield stress of the material and the sheet thickness. Hence, if the sheet thickness of the panel 2 made of an aluminum alloy sheet is approximately 1.5 to 1.6 times larger than the sheet thickness of the panel 2 made of a steel sheet, it can be said that the panel 2 that is made of an aluminum alloy and the panel 2 that is made of a steel sheet are equivalent from the viewpoint of panel rigidity and dent resistance.

In a case where the panel 2 is an aluminum alloy sheet, an aluminum alloy sheet having a tensile strength of 250 MPa or more, preferably, an aluminum alloy sheet having a tensile strength of 300 MPa to 350 MPa, can be mentioned as an example thereof. The sheet thickness t1 of the panel 2 in this case (thickness of the aluminum alloy sheet) is set to 1.00 mm or less, preferably is set to 0.80 mm or less, and more preferably is set to 0.64 mm or less. The lower limit of the sheet thickness t1 of the panel 2 is preferably 0.50 mm. The sheet thickness t1 of the panel 2 is, for example, within the range of 0.50 mm to 1.00 mm.

There are no particular restrictions with regard to the shape of the panel 2. Note that, in the present embodiment, the panel 2 has a shape in which the central portion is upwardly convex in the height direction Z.

The reinforcing member 3 reinforces the panel 2 by being joined to an undersurface 2a of the panel 2. By this means, the reinforcing member 3 increases both the panel rigidity and the dent resistance of the panel 2. That is, in the present embodiment, the panel rigidity and the dent resistance of the panel 2 are secured not by increasing the sheet thickness of the panel 2, but rather are secured by the reinforcing member 3. The reinforcing member 3 is formed, for example, of a metal material such as a steel sheet. The reinforcing member 3 is formed, for example, by subjecting a single steel sheet to press working. The reinforcing member 3 may be an integrally formed product, or may be formed by joining a plurality of members together. In the present embodiment, the reinforcing member 3 is an integrally formed product. A sheet thickness t2 of the reinforcing member 3 (thickness of the steel sheet) is preferably within the range of 0.3 mm to 0.8 mm. The upper limit of the sheet thickness t2 of the reinforcing member 3 is preferably 0.6 mm. The sheet thickness t2 of the reinforcing member 3 may be less than the sheet thickness t1 of the panel 2, may be the same as the sheet 1thickness t1 of the panel 2, or may be greater than the sheet thickness t1 of the panel 2.

The reinforcing member 3 may be an aluminum alloy sheet. In this case, the sheet thickness of the reinforcing member 3 is set to an equivalent value from the viewpoint of panel rigidity and dent resistance with respect to the sheet thickness of the reinforcing member 3 that is made of a steel sheet. Therefore, similarly to the case of the panel 2, if the sheet thickness of the reinforcing member 3 made of an aluminum alloy is approximately 1.5 to 1.6 times larger than the sheet thickness of the reinforcing member 3 made of a steel sheet, it can be said that the reinforcing member 3 made of an aluminum alloy and the reinforcing member 3 made of a steel sheet are equivalent from the viewpoint of panel rigidity and dent resistance. In a case where the reinforcing member 3 is made of an aluminum alloy, the sheet thickness t1 of the reinforcing member 3 (thickness of the aluminum alloy sheet) is within the range of 0.4 to 1.3 mm. The upper limit of the sheet thickness t2 of the reinforcing member 3 is preferably 1.0 mm.

The reinforcing member 3 has an outer circumferential portion 5, and a honeycomb structural body 6 disposed so as to be surrounded by the outer circumferential portion 5.

The outer circumferential portion 5 is a portion that is disposed along an outer circumferential part of the panel 2. When the panel 2 closes the engine room, an outer circumferential edge portion 5a of the panel 5 is received by the automobile body (not illustrated) together with the outer circumferential portion of the panel 2. By this means, a load that acts on an upper face 2b of the panel 2 is received by the automobile body through the reinforcing member 3. An inner circumferential edge portion 5b of the outer circumferential portion 5 is a portion that is arranged so as to surround the honeycomb structural body 6 and is joined to the honeycomb structural body 6.

The honeycomb structural body 6 has a three-dimensional structure which is provided in order to receive a load acting on the upper face 2b of the panel 2. The honeycomb structural body 6 is formed by combining members that have a V-shaped cross section (hat-shaped cross section).

The honeycomb structural body 6 has a plurality of units 7, and a plurality of sub units 8 that are adjacent to the inner circumferential edge portion 5b of the outer circumferential portion 5 and continuous with the outer circumferential portion 5.

The unit 7 which is adjacent to the outer circumferential portion 5 of the reinforcing member 3 is connected to the outer circumferential portion 5 directly or through the sub unit 8.

The sub unit 8 has a configuration equivalent to a configuration in which one portion of the unit 7 has been cut off in the circumferential direction of the hexagonal unit 7. The sub unit 8 has a side portion that is similar to a side portion 10 of the unit 7 that is described later. The side portion is continuous with the inner circumferential edge portion 5b of the outer circumferential portion 5.

Each unit 7 is formed in a hexagonal annular shape in plan view in the vehicle height direction Z. Hereinafter, when simply the term "plan view" is used, it means a plan view in the vehicle height direction Z. In the present embodiment, each unit 7 is formed in the shape of a substantially regular hexagon. The term "regular hexagon" means a hexagon in which the lengths of the respective sides are equal and the interior angles are also a constant angle of 120 degrees. Further, in the present description, the term "substantially regular hexagon" refers to a hexagon that can be treated as a regular hexagon from the viewpoint of the panel rigidity and the viewpoint of the dent resistance of the panel 2. The respective units 7 are formed so that the shape of each unit 7 is substantially the same. Note that, the term "substantially the same" in this case indicates that the configuration is the same except in the respect that the shape of each unit 7 is caused to match a shape which matches the curved shape of the panel 2.

Each unit 7 may also be formed in the shape of a hexagon that is other than a regular hexagon. Examples of a hexagon other than a regular hexagon that can be mentioned include a hexagon in which the lengths of the respective sides are not uniform, and a hexagon in which the interior angles are not uniform at 120 degrees. Examples of a hexagon in which the lengths of the respective sides are not uniform that can be mentioned include a hexagon in which the length of a front end side and the length of a rear end side are set to a predetermined first length, and which has four sides whose lengths are each set to a predetermined second length that is different from the first length.

The honeycomb structural body 6 has a structure formed from a plurality of the units 7 having a hexagonal annular shape disposed in a close-packed arrangement. In this case, the term "close-packed" means that, in a case where the honeycomb structural body 6 has other units 7 to which the respective side portions 10 of a given unit 7 are adjacent, the given unit 7 is disposed without a gap existing between given unit 7 and one side portion 10 of each of the relevant other units 7. Specifically, each unit 7 is partitioned off from the other units 7 within a top plate 13. As illustrated in FIG.

6, a front end 13b of the top plate 13 forms a boundary of the top plate 13 that includes the front end 13b. The boundary is formed in a hexagonal shape in plan view. By having such a structure formed from the units 7 disposed in a close-packed hexagonal arrangement, the honeycomb structural body 6 can withstand loads in substantially the same manner from all directions including the vehicle height direction Z over the whole area in plan view.

In the present embodiment, the plurality of the units 7 are formed symmetrically in the vehicle width direction X as a whole. Specifically, in the present embodiment, three of the units 7 are arranged side by side in the front-to-rear direction at the center in the vehicle width direction X. Further, in plan view, the plurality of units 7 are arranged symmetrically in the vehicle width direction X with reference to a virtual line A1 extending in the front-to-rear direction through the center of the aforementioned three units 7 in the vehicle width direction X. The arrangement of the units 7 is not limited to this structure, and because the panel rigidity, the dent resistance and the mass do not depend on the direction of the units 7, there is no constraint on the direction of the units 7.

In the present embodiment, in the direction toward the right side from the aforementioned three units 7 arranged at the central position in the vehicle width direction X are provided, in the following order, four units 7 which are arranged side by side in the vehicle length direction Y, a further three units 7 which are arranged side by side in the vehicle length direction Y, a further two units 7 which are arranged side by side in the vehicle length direction Y, and a further two units 7 which are arranged side by side in the vehicle length direction Y. Furthermore, similarly to the foregoing arrangement, in the direction toward the left side from the aforementioned three units 7 arranged at the central position in the vehicle width direction X are provided, in the following order, four units 7 which are arranged side by side in the vehicle length direction Y, further three units 7 which are arranged side by side in the vehicle length direction Y, further two units 7 which are arranged side by side in the vehicle length direction Y, and further two units 7 which are arranged side by side in the vehicle length direction Y Each of the units 7 has six of the side portions 10 (10a to 10f). In the present embodiment, in each of the units 7, a front side portion 10a and a rear side portion 10d extend along the vehicle width direction X, respectively. Further, in each of the units 7, the remaining four side portions 10 extend in a direction that inclines with respect to the vehicle length direction Y in plan view.

Each of the side portions 10 (10a to 10f) has a floor 11, a inclined wall 12, and the top plate 13.

The floor 11 is adjacent to the panel 2, and in the side portion 10, the floor 11 is a portion that is arranged closest to the panel 2. The floor 11 is a strip-shaped portion. The floor 11 is a flange portion of the side portion 10, and the floors 11 of the six side portions 10 form a hexagonal flange. The inner end parts of six of the floors 11 constitute an annular end part 20 which is centered on the center of the annular unit 7 as a whole. The annular end part 20 of the unit 7 which is on the center side of the unit 7 is an end part that is arranged on the center side of the unit 7. The annular end part 20 is centered on the center of the unit 7.

In a cross section (cross section illustrated in FIG. 5) orthogonal to the longitudinal direction of the side portion 10, an outer end part 11c of the floor 11 is the intersection point between a virtual line V1 including an upper face 11b (rectilinear portion) of the floor 11 and a virtual line V2 including an intermediate portion (rectilinear portion) of an upper side face 12a of the inclined wall 12. The intersection point between the virtual lines V1 and V2 is the outer end part 11c and is also a first ridge line 31. In a case where the floor 11 and the inclined wall 12 are connected in a curved shape as in the present embodiment, the outer end part 11c is a virtual end part. That is, in the present embodiment, the first ridge line 31 is a virtual line. On the other hand, in a case where the floor 11 and the inclined wall 12 are connected in a linearly pointed shape, the outer end part 11c is the connecting point between the floor 11 and the inclined wall 12. In this case, the first ridge line 31 is an actual line.

In the present embodiment, the first ridge line 31 is a hexagonal annular ridge line in plan view. The first ridge line 31 is between the floor 11 and the inclined wall 12. The first ridge line 31 is one part of the floor 11, and is also one part of the inclined wall 12. The first ridge line 31 is adjacent to the panel 2.

Each of the two end parts in the longitudinal direction of the floor 11 is formed in a curved shape in plan view, and smoothly connects with the floor 11 of an adjacent side portion 10. In each unit 7, the floor 11 of at least some of the side portions 10 is adhered to the joint 4 at the upper face 11b as the floor surface, and is adhered to the panel 2 through the joint 4. In the floor 11, the upper face 11b is a face which faces the undersurface 2a of the panel 2.

In the present embodiment, a length L1 of one side of the first ridge line 31 is set to a length that is 40 mm or more and 75 mm or less. If the length L1 of one side of the first ridge line 31 is less than the aforementioned lower limit, the span over which one unit 7 supports the panel 2 will be short and the panel rigidity can be increased. However, the tolerance of deflection of the panel 2 will be small, and the dent resistance will decrease. In addition, the number of hexagonal annular units 7 disposed in a close-packed arrangement will be too large, and as a result the reinforcing member 3 will be heavy. On the other hand, if the length L1 of one side of the first ridge line 31 is more than the aforementioned upper limit, the span over which one unit 7 supports the panel 2 will be too long, and it will be difficult to secure sufficient panel rigidity. By setting the length L1 of one side of the first ridge line 31 within the aforementioned range, sufficient panel rigidity and sufficient dent resistance can be secured while lightening the reinforcing member 3. Hence, in the automobile hood 1, sufficient panel rigidity and dent resistance can be secured in the panel 2 while achieving a reduction in the weight of the panel 2.

A width W1 (width at a cross section orthogonal to the longitudinal direction of the side portion 10) of the upper face 11b of the floor 11 is the distance between an inner end part 20 and the outer end part 11c of the floor 11. The width W1 is 2 mm or more over the whole area of the annular end part 20 in the circumferential direction of the annular end part 20. In order to both reduce the weight of the automobile hood 1 and improve the dent resistance of the panel 2 in a compatible manner, it is necessary that, as described above, the width W1 of the upper face 11b of the floor 11 is 2 mm or more over the entire circumference area of the annular end part 20. If, for example, the width W1 were less than 2 mm at a central portion in the longitudinal direction of the side portion 10, it would be easy for a deflection to occur in the panel 2 at a time when a comparatively low load as a load P1 acts on the panel 2 at a position C1 on the center position of the unit 7. Therefore, the panel rigidity of the panel 2 would decrease.

Thus, the width W1 of the upper face 11b of the floor 11 is set to, at lowest, 2 mm or more, and the center of the annular end part 20 is caused to coincide with the center of the first ridge line 31. As illustrated in FIGS. 7A and 7B, at each corner (apex) of the hexagonal first ridge line 31, the distance between the corner and the annular end part 20 is a corner width W11 among the overall width W1. Further, on each of the six sides of the first ridge line 31, the distance between the center of one side of the first ridge line 31 and the annular end part 20 is a center width W12 among the overall width W1. In the present embodiment, the corner width W11> the center width W12. By adopting a configuration in which the corner width W11> the central width W12, it is possible to improve the panel rigidity and improve the dent resistance of the panel 2 while achieving a reduction in the weight of the reinforcing member 3 in a compatible manner.

In the present disclosure, in plan view, all of the annular end part 20 is between a first circle CR1 and a second circle CR2. The first circle CR1 is a circle inscribed within the first ridge line 31. The second circle CR2 is concentric with the first circle CR1. Further, a second radius r2 as the radius of the second circle CR2 is set to 60% (r2=0.6 r1) of a first radius r1 as the radius of the first circle CR1.

In plan view, a center point P1 of the first circle CR1, a center point P2 of the second circle CR2, a center point P3 (centroid) of the first ridge line 31 having a hexagonal annular shape, and a center point P20 of the annular end part 20 coincide one another. In the present embodiment, the annular end part 20 is formed in a perfect circle or a substantially perfect circle that is centered on the center point P3 of the first ridge line 31 in plan view. In this case, the phrase "substantially perfect circle" means a case where, after performing a hole forming process on a blank or an intermediate formed product to serve as the reinforcing member 3 in order to form the annular end part 20, the blank or the intermediate formed product is further subjected to press working or the like to form the unit 7, and consequently a strictly perfect circle is not formed.

By disposing the annular end part 20 between the first circle CR1 and the second circle CR2 in plan view, of the entire unit 7, the inner side portion of the annular end part 20 is hollow, and the reinforcing member 3 can be reduced in weight. In addition, as illustrated in the conceptual side view of FIG. 8B, a maximum support span SP of the panel 2 by the annular end part 20, that is, the diameter of the annular end part 20, can be set to a value that is neither too large nor too small. Thus, the panel rigidity of the panel 2 can be sufficiently secured and the dent resistance of the panel 2 can also be sufficiently secured. That is, it is possible to reduce the weight of the automobile hood 1, secure sufficient panel rigidity of the panel 2, and secure sufficient dent resistance of the panel 2 in a compatible manner. Therefore, even when an indenter ID is pushed into the upper face 2b of the panel 2, it is difficult for a dent to occur.

As described above, the annular end part 20 is between the first circle CR1 and the second circle CR2, and the width W1 is 2 mm or more over the entire upper face 11 of the floor 11,. According to this configuration, sufficient panel rigidity and dent resistance of the panel 2 can be secured while achieving a reduction in the weight of the automobile hood 1.

Further, by making the annular end part 20 circular, a load from the panel 2 can be received with a stable posture by the annular end part 20, while also reducing the weight of the reinforcing member 3.

Figure 8A:
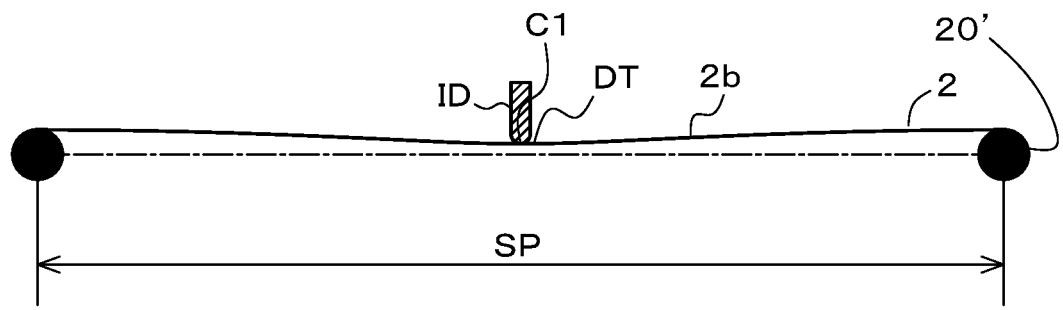
FIG. 8A is a conceptual side view for describing a case where a maximum support span of a panel supported by an annular end part is too long.
Figure 8B:
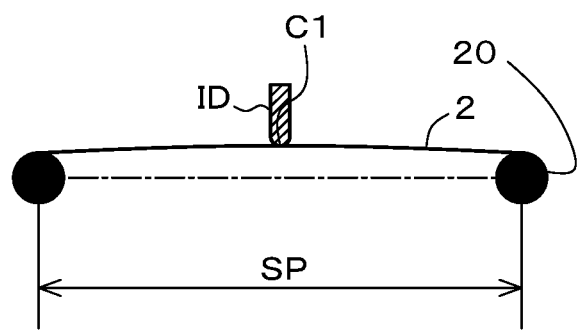
FIG. 8B is a conceptual side view for describing a case where a maximum support span of a panel supported by an annular end part is appropriate.

Note that, with regard to the annular end part 20, if even one portion of the annular end part 20 is larger than the first circle CR1, as illustrated in the conceptual side view of FIG. 8A, the maximum support span SP of the panel 2 supported by an annular end part 20' (diameter of the annular end part 20') will be too large. As a result, the area of the upper face 11b of the floor 11 which can be adhered to the panel 2 will be narrow. Consequently, the efficiency of the work of applying the joint 4 to the floor 11 will be less efficient. In addition, the panel rigidity of the panel 2 will decrease. Furthermore, the dent resistance will also decrease. More specifically, the dent resistance is significantly affected by constraint of the surrounding part (annular end part 20') with regard to the load that acts on the panel 2 when the indenter ID is pressed into the upper face 2b of the panel 2. Therefore, in a case where the distance between the point of action of a load applied by the indenter ID and the surrounding constraint position (the annular end part 20') is long as illustrated in FIG. 8A, when the load applied by the indenter ID is, for example, low (a time of a low load), the deflection of the panel 2 becomes large. Consequently, it is difficult to maintain the designed curved shape of the panel 2, and therefore the dent resistance is liable to decrease and a dent DT is liable to occur.

Figure 8C:
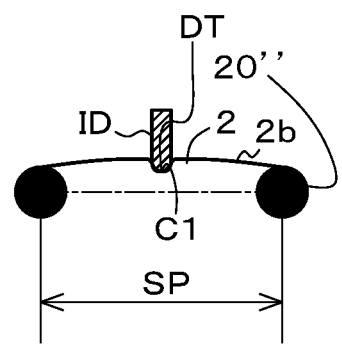
FIG. 8C is a conceptual side view for describing a case where a maximum support span of a panel supported by an annular end part is too short.

On the other hand, if even one portion of an annular end part 20" is located further on the inner side than the second circle CR2, as illustrated in the conceptual side view of FIG. 8C, a hollow region of the inner side portion of the annular end part 20" of the unit 7 is small. Hence, the reinforcing member 3 becomes heavy, and the weight efficiency (the ratio of the reinforcing effect of the reinforcing member 3 to the weight of the reinforcing member 3) deteriorates. Furthermore, the advantageous effect of improving the dent resistance of the panel 2 by means of the reinforcing member 3 also decreases. More specifically, as described above, the dent resistance is significantly affected by constraint of the surrounding part (the annular end part 20") with regard to the load from the indenter ID that acts on the panel 2. Therefore, if the distance between the point of action of the load from the indenter ID and the annular end part 20" (constraint position) is too short as illustrated in FIG. 8C, when the load from the indenter ID is, for example, low (a time of a low load), almost no deflection of the panel 2 occurs. As a result, localized stress arises at the point of action of the load from the indenter ID, and consequently a stress state that is more than the yield load of the panel 2 is liable to occur and a dent DT is liable to occur.

As is clearly illustrated in FIG. 7A and FIG. 7B, in the present embodiment the annular end part 20 is an annular shape in plan view. Further, according to the present embodiment, a radius r20 of the annular end part 20 is 90% of the first radius r1. Note that, the radius of the annular end part 20 may be 80% of the first radius r1, may be 70% of the first radius r1, or may be 60% of the first radius r1.

Figure 9A:
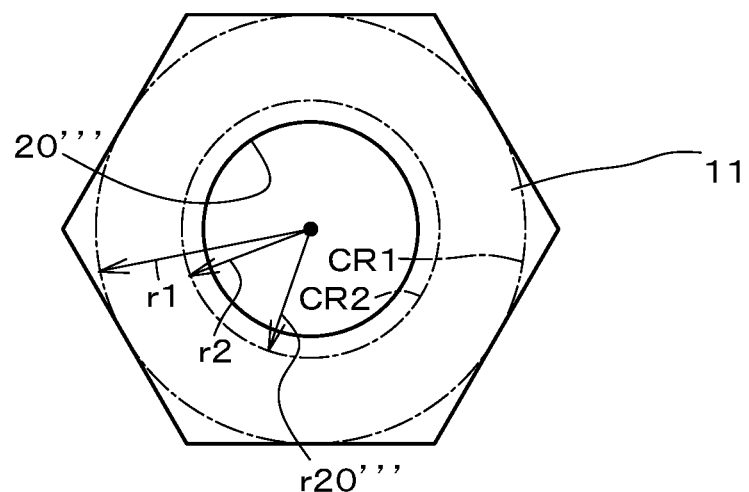
FIG. 9A is a schematic plan view illustrating the principal part of a first out-of-range example.
Figure 9B:
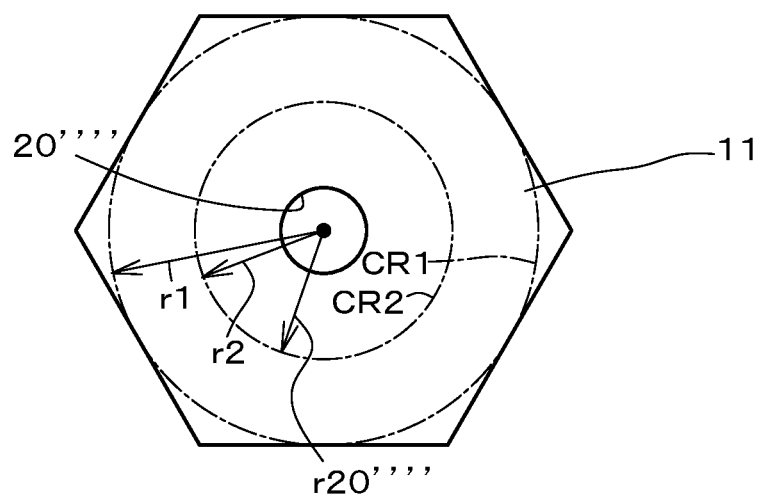
FIG. 9B is a schematic plan view illustrating the principal part of a second out-of-range example.

On the other hand, FIG. 9A and FIG. 9B illustrate two out-of-range examples of the present disclosure. As a first out-of-range example, an example in which a radius r20''' of an annular end part 20''' is 50% of the first radius r1 (FIG. 9A) can be mentioned, and an example in which a radius r20''' of an annular end part 20''' is 20% of the first radius r1 (FIG. 9B) can also be mentioned as an out-of-range example. Thus, in the out-of-range examples illustrated in FIG. 9A and FIG. 9B, the annular end parts 20''' and 20''' are located on the inner side of the second circle CR2.

In the above description a form in which the annular end part 20 is a circular shape is described. However, the configuration of the annular end part 20 is not limited to the configuration described above. A polygon can be mentioned as an example in which the annular end part 20 has a shape other than a circular shape in plan view. Note that, even in a case where the annular end part 20 is a polygon, the lower limit of the width W1 is 2 mm, and the entire area of the annular end part 20 is disposed between the first circle CR1 and the second circle CR2.

A hexagon and a dodecagon can be mentioned as preferable examples of the aforementioned polygon in the present disclosure.

Figure 10A:
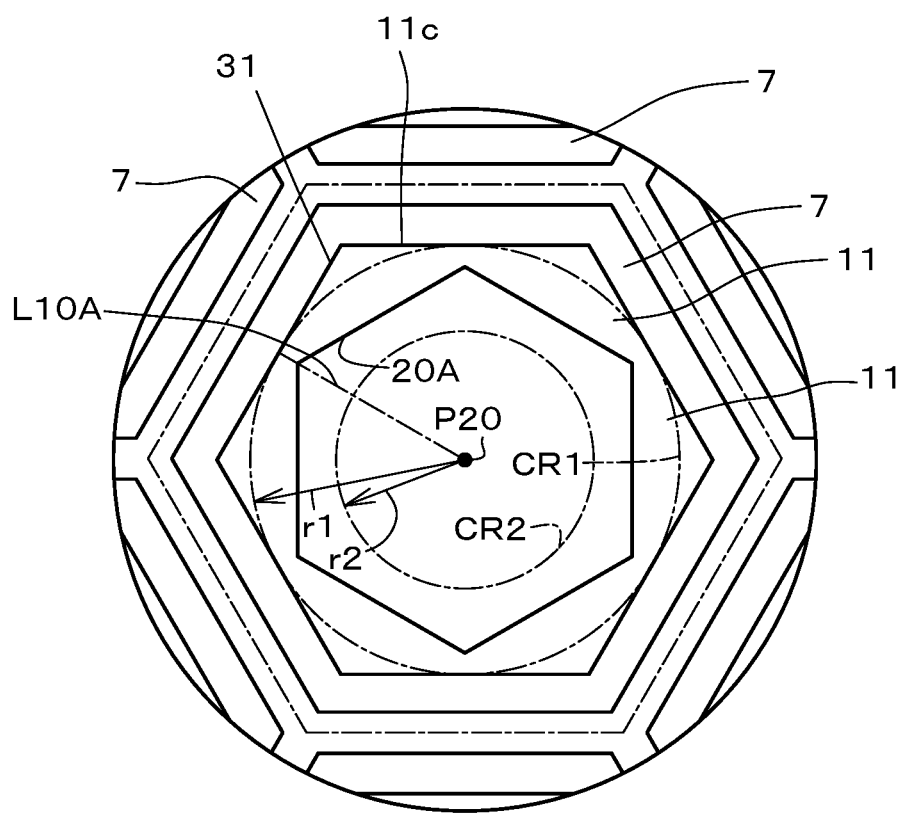
FIG. 10A is a view illustrating, in a simplified form, the circumference of one unit according to a first modification.
Figure 10B:
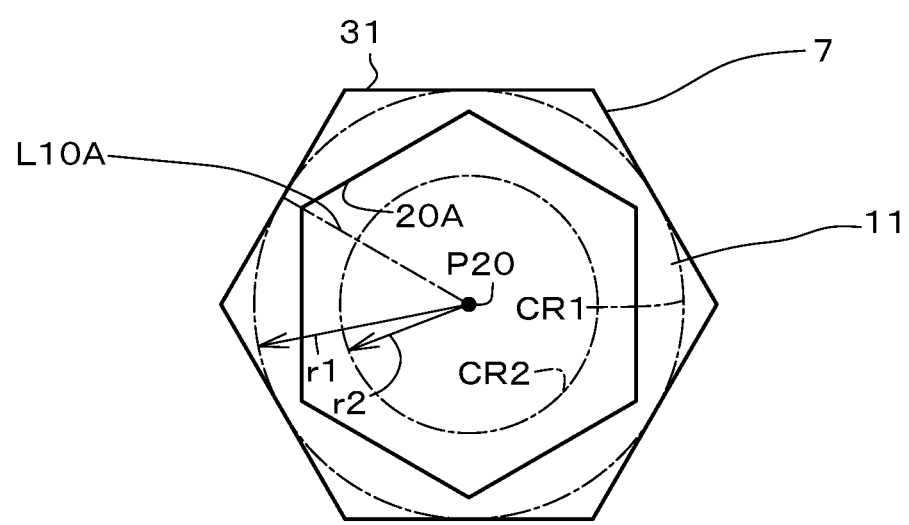
FIG. 10B is a view illustrating one portion extracted from FIG. 10A.

An example in which a hexagonal annular end part 20A is provided instead of the circular annular end part 20 is illustrated as a first modification in FIG. 10A and FIG. 10B. The annular end part 20A is a regular hexagon or a substantially regular hexagon. In this case, the phrase "substantially regular hexagon" means a case where, after performing a hole forming process on a blank or an intermediate formed product to serve as the reinforcing member 3 in order to form the annular end part 20A, the blank or the intermediate formed product is further subjected to press working or the like to form the unit 7, and as a result the annular end part 20A does not become a strictly regular hexagon. In this first modification, each apex of the annular end part 20A is disposed on a line segment L10A that links a center point P20 of the annular end part 20A and the midpoint of the corresponding side of the hexagonal first ridge line 31. Note that, each apex of the annular end part 20A may be disposed on a line segment that links the center point P20 of the annular end part 20A and the corresponding apex of the hexagonal first ridge line 31.

By making the annular end part 20A circular in this way, a load from the panel 2 can be received with a stable posture by the annular end part 20A, while also reducing the weight of the reinforcing member 3.

Figure 11A:
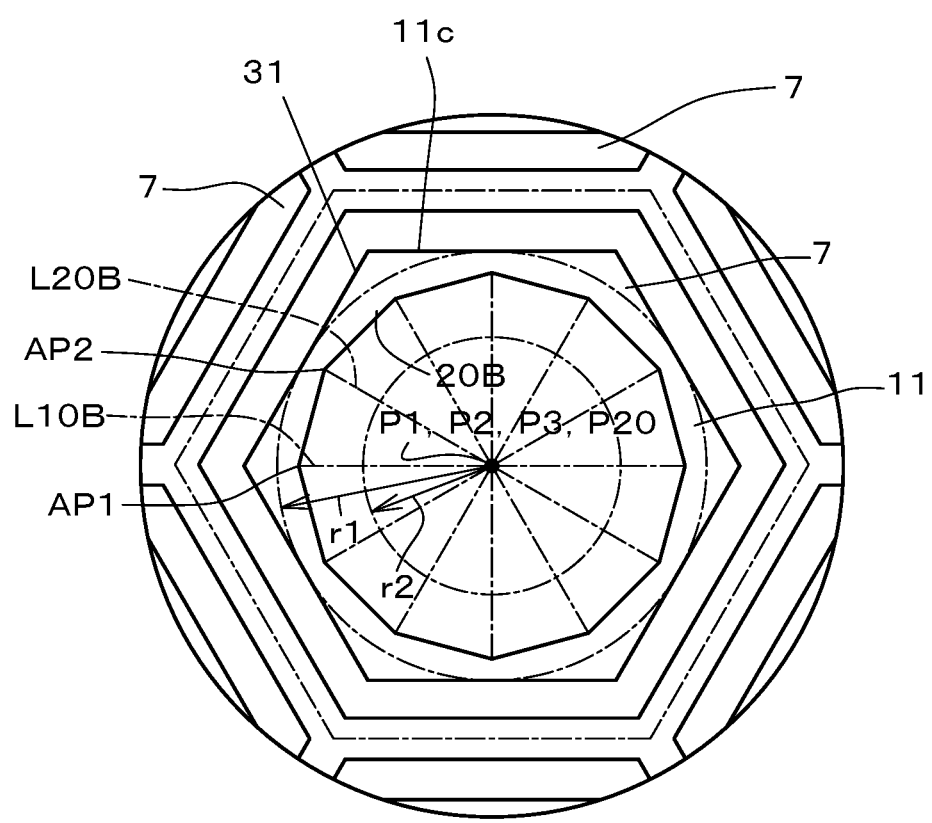
FIG. 11A is a view illustrating, in a simplified form, the circumference of one unit according to a second modification.
Figure 11B:
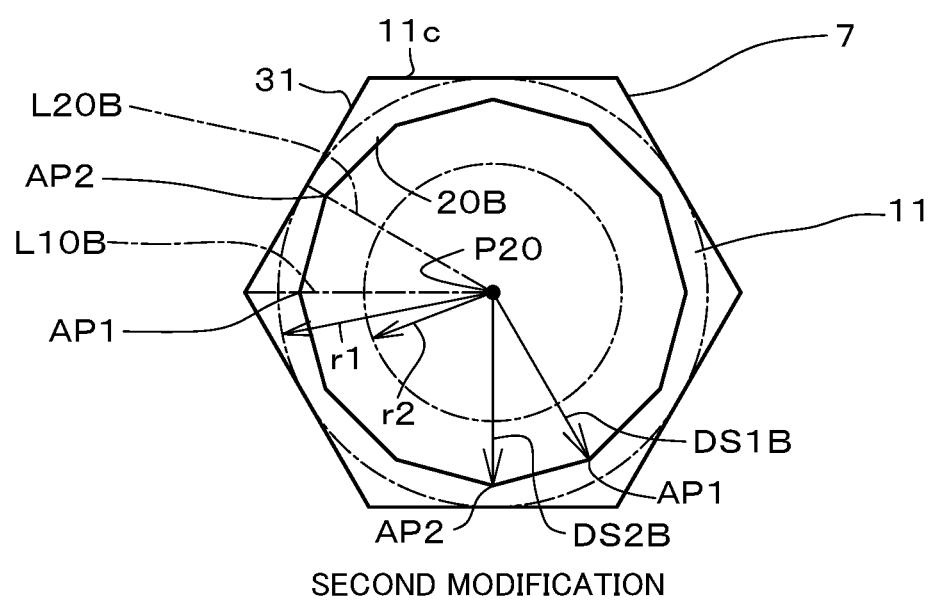
FIG. 11B is a view illustrating one portion extracted from FIG. 11A.

An example in which a dodecagonal annular end part 20B is provided instead of the circular annular end part 20 is illustrated as a second modification in FIG. 11A and FIG. 11B. The annular end part 20B is a regular dodecagon or a substantially regular dodecagon. In this case, the phrase "substantially regular dodecagon" means a case where, after performing a hole forming process on a blank or an intermediate formed product to serve as the reinforcing member 3 in order to form the annular end part 20B, the blank or the intermediate formed product is further subjected to press working or the like to form the unit 7, and as a result the annular end part 20B does not become a strictly regular dodecagon. In this second modification, two kinds of apexes AP1 and AP2 are set as the apexes of the annular end part 20B. Each apex AP1 is disposed on a line segment L10B that links a center point P20 of the annular end part 20B and a corresponding single apex of the hexagonal first ridge line 31. Further, each apex AP2 is disposed on a line segment L20B that links the center point P20 of the annular end part 20B and the midpoint of the corresponding side of the hexagonal first ridge line 31. Further, the apexes AP1 and the apexes AP2 are alternately arranged. In the second modification, a distance DS1B from the center point P20 of the annular end part 20B to the respective apexes AP1 and a distance DS2B from the center point P20 of the annular end part 20B to the respective apexes AP2 are the same. Note that, as long as the annular end part 20B is disposed between the first circle CR1 and the second circle CR2, the distance DS1B and the distance DS2B may be different from each other.

By making the annular end part 20B dodecagon in this way, a load from the panel 2 can be received with a stable posture by the annular end part 20B, while also reducing the weight of the reinforcing member 3. The foregoing is a description of the schematic configuration of the floor 11.

As illustrated in FIG. 5, the inclined wall 12 extends downward from the floor 11.

The inclined wall 12 is disposed between the floor 11 and the top plate 13, and connects the floor 11 and the top plate 13. The inclined wall 12 is provided over the entire area in the longitudinal direction of the side portion 10 in which the inclined wall 12 in question is provided. An angle $\theta1$ that the inclined wall 12 forms with respect to the floor 11, for example, an angle $\theta1$ which is formed by the upper side face 12a of the inclined wall 12 and the upper face 11b of the floor 11, is preferably set within a range of 40 degrees to 90 degrees. When the aforementioned angle $\theta1$ is equal to or greater than the aforementioned lower limit, the inclined wall 12 can be sufficiently caused to function as a pillar, and therefore a load transmitted from the panel 2 to the floor 11 can be received by the inclined wall 12 with a small amount of deformation. Further, when the angle $\theta1$ is less than or equal to the aforementioned upper limit, the unit 7 has a shape which gradually increases in width progressively in the downward direction (shape in which a distance between inclined walls 12 and 12 that face each other widens progressively toward the lower side in the vehicle height direction Z), and therefore the unit 7 is easy to be formed.

The length of the inclined wall 12 in the vehicle height direction Z is a component in the vehicle height direction Z of the distance between the first ridge line 31 and a second ridge line 32, and is approximately 16 mm in the present embodiment. In a cross section orthogonal to the longitudinal direction of the side portion 10, the second ridge line 32 is an intersecting point between a virtual line V3 which is a tangential line to the apex of a lower side face 13c of the top plate 13, and the virtual line V2. The intersecting point between the virtual lines V2 and V3 is the second ridge line 32 and is also an inner end part 13d of the top plate 13. In a case where the inclined wall 12 and the top plate 13 are connected in a curved shape as in the present embodiment, the second ridge line 32 is a virtual ridge line. On the other hand, in a case where the inclined wall 12 and the top plate 13 are connected in a linearly pointed shape, the second ridge line 32 is an actual line. The second ridge line 32 can be said to be one part of the inclined wall 12, and can also be said to be one part of the top plate 13.

In the present embodiment, the second ridge line 32 is a hexagonal annular ridge line, similarly to the first ridge line 31. The second ridge line 32 is located at the outer circumference of the lower end of the inclined wall 12, and is separated from the panel 2. The first ridge line 31 is one example of "a hexagonal annular ridge line between the inclined wall and the floor", and is a ridge line at the end part on the floor 11 side of the inclined wall 12. In the present embodiment, the first ridge line 31 and the second ridge line 32 are similar to each other in plan view. In plan view, the overall length of the second ridge line 32 is longer than the overall length of the first ridge line 31. In the vehicle height direction Z, the distance from the panel 2 to the second ridge line 32 is longer than the distance from the panel 2 to the first ridge line 31. Note that, the smaller the inclination angle $\theta1$ of the inclined wall 12 is, the larger the ratio of the length of one side of the second ridge line 32 to the length L1 of one side of the first ridge line 31 becomes. Therefore, the length of one side of the second ridge line 32 is preferably set to 40 mm or more and 95 mm or less.

In the present embodiment, the thickness (length in the vehicle height direction Z) of the unit 7 can be set by setting the length and the angle $\theta1$ of the inclined wall 12. The floor 11 is continuous with the upper end of the inclined wall 12. The top plate 13 is continuous with the lower end of the inclined wall 12. In a cross section orthogonal to the longitudinal direction of the side portion 10, the floor 11 and the inclined wall 12 are continuous with each other in a smoothly curving shape, and are connected in a form in which it is difficult for stress concentration to occur. Similarly, the top plate 13 and the inclined wall 12 are continuous with each other in a smoothly curving shape, and are connected in a form in which it is difficult for stress concentration to occur. Note that, the floor 11 and the inclined wall 12 may be connected in a pointed shape, and the inclined wall 12 and the top plate 13 may be connected in a pointed shape.

In the unit 7, the top plate 13 is a portion that is farthest from the panel 2. The top plate 13 is formed in a curved shape which is convex in the downward direction, or is formed in a shape that extends approximately horizontally. The top plate 13 is provided over the entire area in the longitudinal direction of the side portion 10 in which the inclined wall 12 in question is provided. In a cross section orthogonal to the longitudinal direction of the side portion 10, the floor 11, the inclined wall 12, and the top plate 13 are arranged in that order from the inner side to the outer side of the unit 7. The front end 13*b* of the top plate 13 in one unit 7 is integral with the front end 13*b* of the top plate 13 in an adjacent unit 7.

Figure 12:
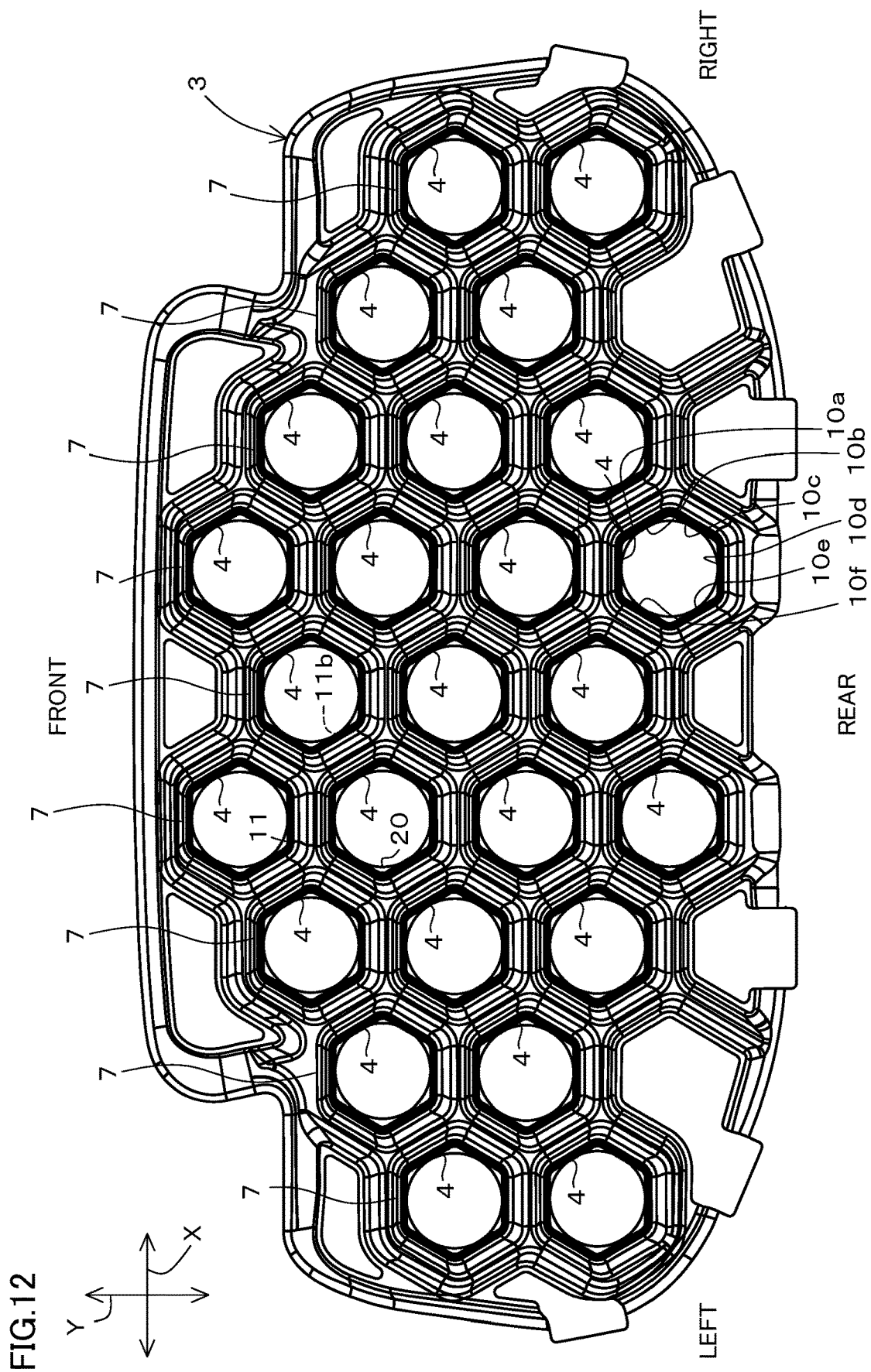
FIG. 12 is a view for describing one example of the arrangement of joints in an automobile hood.

FIG. 12 is a view for describing one example of the arrangement of the joints 4 in the automobile hood 1. Next, the joint 4 will be more specifically described while referring mainly to FIG. 5 and FIG. 12. In FIG. 5, the joint 4 is indicated by hatching that represents a cut cross-section. In the present embodiment, the joint 4 is an adhesive. A mastic sealer (mastic adhesive) can be exemplified as the adhesive. A resin-based adhesive can be exemplified as the mastic sealer. The adhesive may have a property of being cured at normal temperature (for example, 20 degrees Celsius), or may have a property of being cured by undergoing a heating process or a drying process.

The joint 4 is provided so as to sufficiently secure both panel rigidity and dent resistance while achieving a reduction in the weight of the automobile hood 1. Specifically, the joint 4 is provided in at least two of the side portions 10 that are parallel to each other among the six side portions 10. In the present embodiment, in each of the units 7, the joint 4 is provided in all of the six side portions 10. In the present embodiment, on the upper face 11*b* of the floor 11 of each side portion 10, the joint 4 is provided over the entire area in the longitudinal direction of the side portion 10, and the joints 4 provided on the side portions 10 that are adjacent are integrated with each other. By this means, in the present embodiment, in each of the units 7, the joint 4 is a hexagonal shape.

A thickness t3 of the joint 4 is, for example, about several mms, and is an extremely large value relative to both the sheet thickness t1 of the panel 2 and the sheet thickness t2 of the reinforcing member 3. Hence, the proportion that the joint 4 accounts for with regard to the material cost and the weight of the automobile hood 1 cannot be ignored. Therefore, from the viewpoint of the material cost and also reducing the weight of the automobile hood 1, the joint 4 is preferably used in the smallest possible amount. On the other hand, the joint 4 is also a load transmission portion that is provided for transmitting the load from the panel 2 to the unit 7. Therefore, a more preferable usage form of the joint 4 in each unit 7 can be defined from the viewpoint of achieving each of a weight reduction, an improvement in the panel rigidity, and an improvement in the dent resistance.

Figure 13:
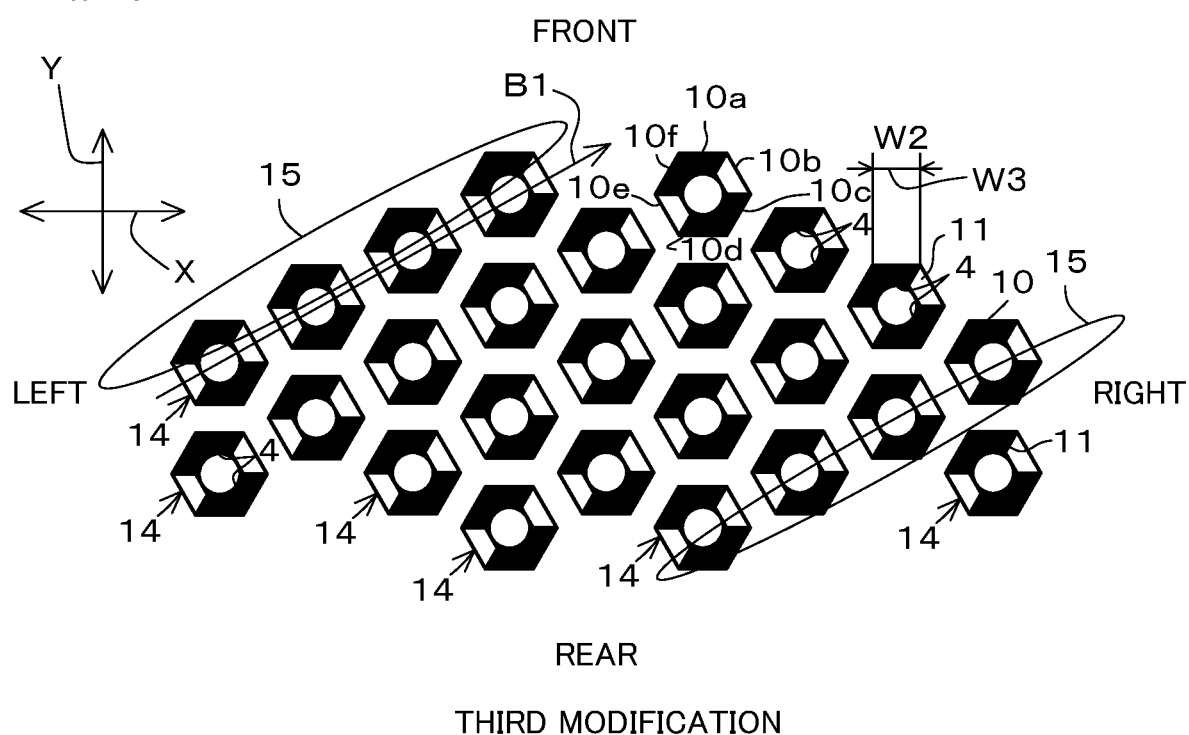
FIG. 13 is a conceptual plan view illustrating the principal part of a third modification of the present disclosure, and shows locations at which joints are provided.

FIG. 13 is a conceptual plan view illustrating the principal part of a third modification of the present disclosure, and shows locations where the joints 4 are provided. The following configuration that is illustrated in FIG. 13 can be mentioned as an example of the third modification of the present embodiment. That is, the joint 4 is provided in some of the side portions 10 among the six side portions 10 (10*a* to 10*f*) of each of the annular units 7. In this modification of the present disclosure, among the six side portions 10, the joint 4 is provided in at least two side portions 10 that face each other in parallel and which are two side portions 10 that are separated from each other. In each side portion 10 in which the joint 4 is provided, the joint 4 extends in a linear stripe along the longitudinal direction of the side portion 10.

A length W2 of the joint 4 in plan view is set within the range of 20% to 100% of an overall length W3 of the floor 11 in the longitudinal direction of the floor 11, and preferably is set within the range of 50% to 100%. In FIG. 13, an example is illustrated in which the length W2= the overall length W3. By making the length W2 of the joint 4 equal to or greater than the aforementioned lower limit, the bonding strength between the floor 11 on which the joint 4 is provided and the panel 2 can be sufficiently secured. In addition, in a case where a process is adopted that adheres the panel 2 and the floor 11 to each other by heating the joint 4, thermal distortion occurs in the panel 2 and the reinforcing member 3 due to the heating in the process for heating the joint 4. However, by providing the joints 4 only on some of the six side portions 10 of the unit 7, the aforementioned thermal distortion can be reduced.

As described above, in the third modification, in each unit 7, the joint 4 is provided in some of the side portions 10 among the six side portions 10, and the joint 4 is not provided in the remaining side portions 10. The whole area of each of the remaining side portions 10 directly faces the panel 2 vertically.

As illustrated in FIG. 13, four of the side portions 10 among the six side portions 10 are joined to the joints 4, and are joined to the panel 2 by the relevant joints 4. That is, the joint 4 is provided on two pairs of the side portions 10 that face each other in parallel in plan view. The remaining two side portions 10 (two side portions 10 which are not adjacent to each other) that are separated from each other are not provided with the joint 4 and are directly adjacent to the panel 2 (through only air).

More specifically, among the six side portions 10, the joint 4 is provided on the front side portion 10*a* and the rear side portion 10*d* which extend in parallel with each other, and the right rear side portion 10*c* and the left front side portion 10*f* which extend in parallel with each other. That is, in the unit 7, the joint 4 is provided on each of four side portions 10 that exclude the right front side portion 10*b* and the left rear side portion 10*e*. By this means, in the honeycomb structural body 6, as illustrated by an arrow B1, a region 14 in which joints are not set is provided in the direction from the left rear toward the right front (toward the diagonally right front side).

By means of this configuration, the honeycomb structural body 6 is provided with a plurality of sets 15 of the joints 4 having a zigzag stripe shape extending from the left rear to the right front. According to this kind of configuration of the honeycomb structural body 6, the three requirements of weight reduction, securing panel rigidity, and securing dent resistance can be satisfied at a high level.

Note that, as long as the relative positional relationship between the joints 4 illustrated in FIG. 13 is satisfied, a similar effect is obtained even if the arrangement of the joint 4 is changed. For example, the arrangement of the plurality of joints 4 as a whole in the third modification illustrated in FIG. 13 may be symmetrically replaced in the vehicle width direction X.

Figure 14:
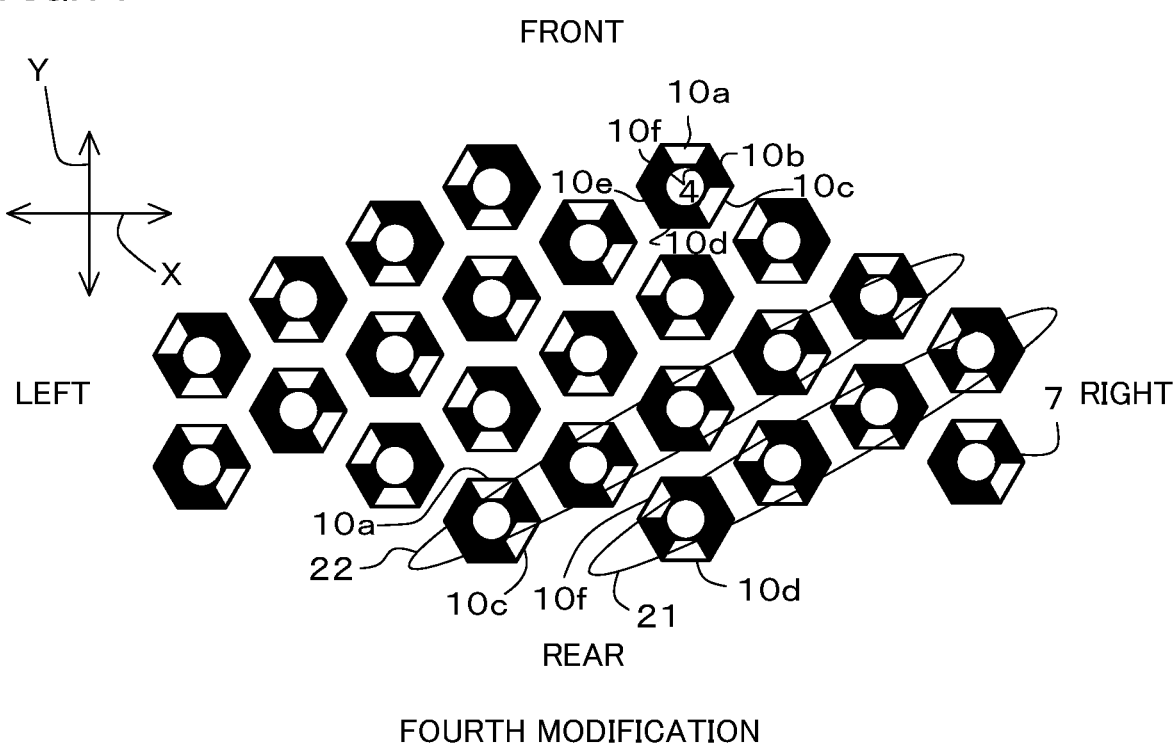
FIG. 14 is a conceptual plan view illustrating the principal part of a fourth modification of the present disclosure, and shows locations at which joints are provided.

Further, instead of the third modification illustrated in FIG. 13, the joints 4 may be arranged in the form shown in a fourth modification illustrated in FIG. 14. In FIG. 14, among the six side portions 10 of the unit 7, for example, the joint 4 is provided on the right front side portion 10b and the left rear side portion 10e as two sides extending in parallel with each other, and on two side portions 10 which are in contact with the two ends of either one of these two side portions 10b and 10e. That is, the joint 4 is provided on four of the side portions 10 in the unit 7. In this second modification, a first unit 21 as a set of the units 7 in which the joint 4 is not provided on the rear side portion 10d and the left front side portion 10f, and a second unit 22 as a set of the units 7 in which the joint 4 is not provided on the front side portion 10a and the right rear side portion 10c are provided. In the first unit 21, the units 7 extend in a row in the direction from the left rear toward the right front. Similarly, in the second unit 22 the units 7 extend in a row in the direction from the left rear toward the right front. Further, the first units 21 and the second units 22 are alternately arranged.

Note that, as long as the relative positional relationship between the joints 4 illustrated in FIG. 14 is satisfied, a similar effect is obtained even if the arrangement of the joint 4 is changed. For example, the arrangement of the plurality of joints 4 as a whole in the fourth modification illustrated in FIG. 14 may be symmetrically replaced in the vehicle width direction X.

In the third modification and the fourth modification described above, a form in which, in each unit 7, the joint 4 is provided in four of the side portions 10, and the joint 4 is not provided in two of the side portions 10 is described as an example. However, the joints 4 need not be arranged in this manner. For example, as illustrated in a fifth modification in FIG. 15, in each unit 7, the joint 4 may be provided on two side portions 10 among the six side portions 10. That is, the joint 4 is provided on a set of two of the side portions 10, 10 that face each other in parallel in plan view. Further, the joint 4 is not provided on the remaining four side portions 10, and therefore the remaining four side portions 10 are directly adjacent to the panel 2.

Figure 15:
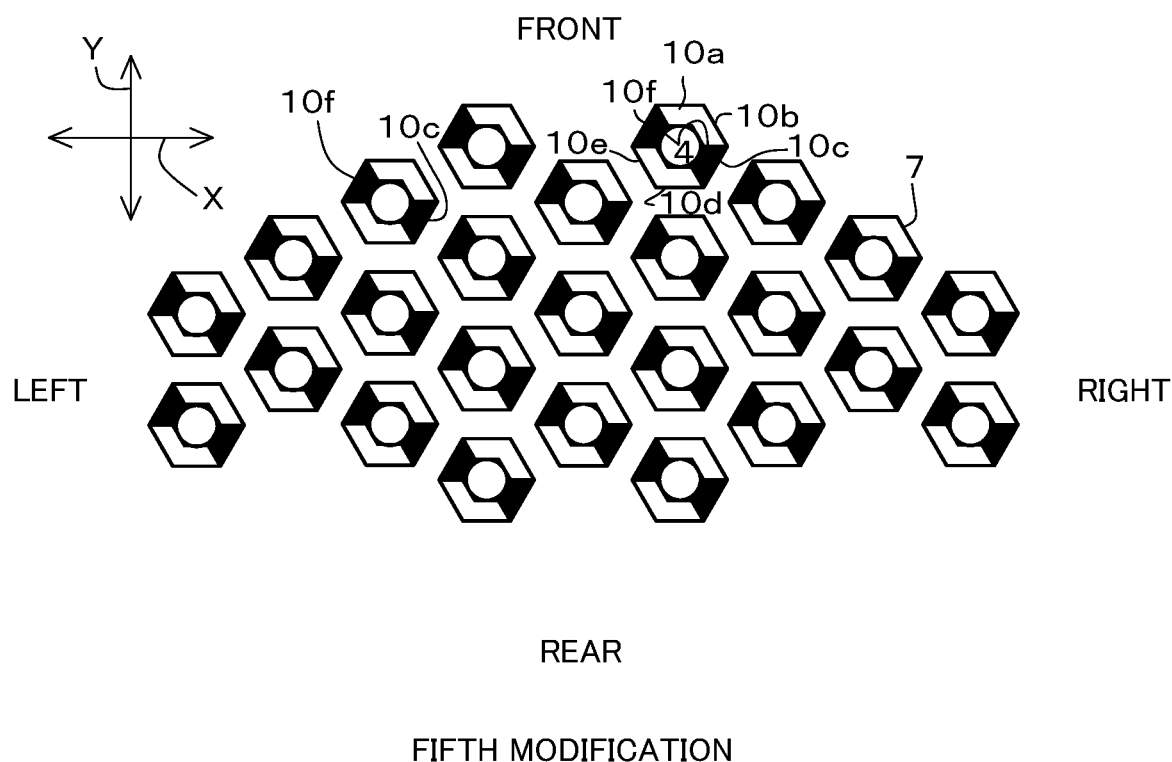
FIG. 15 is a conceptual plan view illustrating the principal part of a fifth modification of the present disclosure, and shows locations at which joints are provided.

In the fifth modification illustrated in FIG. 15, among the six side portions 10 of the unit 7, for example, the joint 4 is provided only on the right rear side portion 10c and the left front side portion 10f which extend in parallel with each other. Therefore, in each unit 7, the joint 4 is not provided on four of the side portions 10. Thus, when a configuration is adopted in which, in each unit 7, the joint 4 is provided on two of the side portions 10 (10c, 10f) which are some of the six side portions 10 and which are parallel with each other, the three requirements of weight reduction, securing panel rigidity, and securing dent resistance can be satisfied at a high level.

Note that, instead of the fifth modification illustrated in FIG. 15, a modification (not illustrated in the drawings) in which, among the six side portions 10, the joint 4 is provided on only the front side portion 10a and the rear side portion 10d which are parallel with each other, and a modification (not illustrated in the drawings) in which, among the six side portions 10, the joint 4 is provided on only the right front side portion 10b and the left rear side portion 10e which are parallel with each other can be given as examples of the arrangement of the joints 4.

By adopting any one of the configurations according to the embodiment and the respective modifications that are described above with respect to the joints 4, improvement in the performance of the panel 2 (at least improvement of the panel rigidity and improvement of the dent resistance) and a reduction in the weight of the panel 2 can be realized.

Note that, in the embodiment and respective modifications that are described above, in each side portion 10 on which the joint 4 is provided, the joint 4 is not limited to a case in which the joint 4 is formed in a continuous linear shape, and the joint 4 may be intermittently arranged in dot shapes.

According to the automobile hood 1 of the present embodiment, with respect to each side portion 10 on which the joint 4 is provided among the six side portions 10 of the unit 7, the side portion 10 is in contact with the joint 4 over a range of 20% or more of the side portion 10 with regard to the direction in which the side portion 10 extends. According to this configuration, both the panel rigidity and the dent resistance of the panel 2 can be increased. In particular, if the joint 4 is a linear shape that extends continuously on the side portion 10, both the panel rigidity and dent resistance of the panel 2 can be increased more in comparison to a case where the joint 4 is provided in a dot shape at corner portions of the hexagon or a case where the joint 4 is provided in a dot shape at the center of the side portion 10.

Further, according to the automobile hood 1 of the present embodiment, the sheet thickness $t_1$ of the panel 2 made of a steel sheet is 0.6 mm or less. In a case where the sheet thickness $t_1$ of the panel 2 is 0.6 mm or less in this way, the panel rigidity and dent resistance obtained from the rigidity of the panel 2 itself decrease extremely in comparison to a case where the sheet thickness $t_1$ of the panel 2 is 0.65 mm or more. More specifically, the panel rigidity of the panel 2 depends on the Young's modulus and the sheet thickness of the panel 2, and in particular, changes with the square of the sheet thickness. If the design sheet thickness of the panel 2 formed of a steel sheet is changed from 0.65 mm to 0.6 mm, the panel rigidity that the panel 2 can secure by itself is reduced extremely. This reduction in rigidity is particularly noticeable from the aspect of a sense of touch perceived when the panel 2 is pressed by a human hand, which is a factor that reduces the salability of the automobile. Thus, in relation to the panel rigidity of the panel 2 that is made of steel, a critical significance exists with respect to the sheet thickness $t_1$ being between 0.6 mm and 0.65 mm. Further, in a case where a thin panel 2 having a sheet thickness $t_1$ of 0.6 mm or less is used as in the present embodiment also, by combining the reinforcing member 3 and the panel 2 for reinforcement and stiffening, as the automobile hood 1, panel rigidity and dent resistance that are approximately equal to a case where the sheet thickness $t_1$ of the panel 2 is 0.65 mm can be secured. Moreover, since the sheet thickness $t_1$ of the panel 2 is reduced, a reduction in the weight of the automobile hood 1 can be achieved through the weight reduction of the panel 2.

In addition, if the panel 2 and the reinforcing member 3 are made of steel, there is an advantage from the view point of material cost in comparison to the panel and the reinforcing member that are made of an aluminum alloy. Furthermore, in the case of an automobile hood made of an aluminum alloy, the idea of securing panel rigidity with a reinforcing member located below a panel has originally not existed heretofore. Further, because the Young's modulus of an aluminum alloy is low compared to the Young's modulus of steel, the rigidity of an aluminum alloy is lower than the rigidity of steel. Therefore, in an automobile hood that is made of an aluminum alloy, in order to secure rigidity that is equivalent to the rigidity of the automobile hood 1 made of steel, it is necessary to make the sheet thickness of the members larger. Hence, in order to satisfy the requirements regarding both panel rigidity and dent resistance in a panel that is made of an aluminum alloy, the sheet thickness increases. Therefore, the viewpoint of improving both the panel rigidity and the dent resistance while reducing the sheet thickness of the panel 2 and the reinforcing member 3 as in the present embodiment does not exist with respect to an automobile hood that is made of an aluminum alloy. However, as described above, from the viewpoint of panel rigidity and dent resistance, a panel and a reinforcing member made of a steel sheet and a panel and a reinforcing member made of an aluminum alloy sheet can be set to thicknesses such that equivalent performance is obtained. Therefore, in the present embodiment, the panel 2 and the reinforcing member 3 may be steel sheets or may be aluminum alloy sheets.

An embodiment and modifications of the present disclosure have been described above. However, the present disclosure is not limited to the above embodiment and modifications. In the present disclosure, various changes are possible within the scope of the accompanying claims.

EXAMPLES

Geometric models of the automobile hoods 1 shown in the embodiment and modifications were created on a computer using CAD (Computer Aided Design) software. That is, the automobile hoods 1 having the panel 2, the reinforcing member 3 and the joint 4 were created on a computer. The panel rigidity and dent resistance were then evaluated by performing CAE (Computer Aided Engineering) analysis, that is, computer simulation, with respect to the geometric models of the automobile hood 1. Note that, the characteristics of each part were as follows.

Panel 2: Made of a high-strength steel sheet of 590 MPa-class. Yield stress=375 MPa, tensile strength=622 MPa, sheet thickness t1=0.4mm.

Reinforcing member 3: Made of a mild steel sheet. Yield stress=163 MPa, tensile strength=325 MPa, sheet thickness t2=0.3 mm.

Note that, the modulus of elasticity of the steel sheet was a Young's modulus of 206 GPa, with a Poisson's ratio of 0.3.

For the present examples, Disclosure Examples 1 to 7 and Comparative Examples 1 to 4 were prepared. With regard to these Disclosure Examples 1 to 7 and Comparative Examples 1 to 4, the length L1 of one side of the hexagonal first ridge line 31, the corner width W11 of the upper face 11b of the floor 11, and the center width W12 of the upper face 11b were as shown in Table 1.

Figure 16:
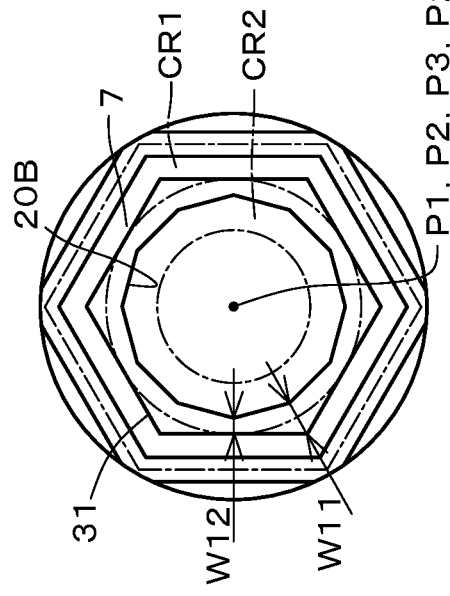
FIG. 16 is a schematic plan view illustrating shapes A to D with respect to an annular end part.
Figure 16:
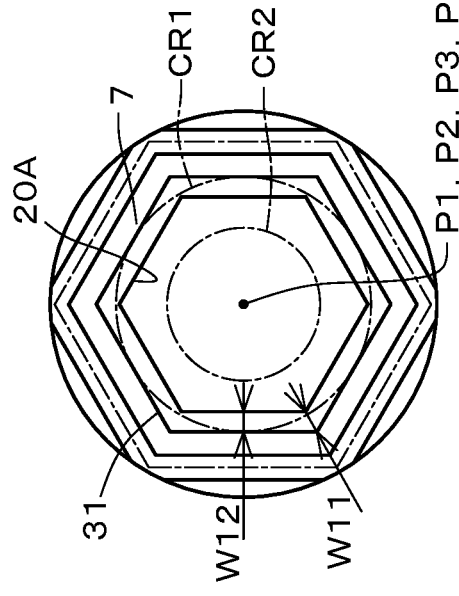
Figure 16:
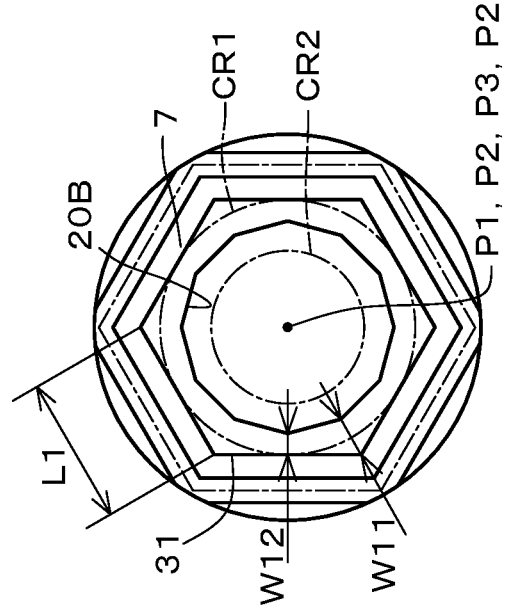
Figure 16:
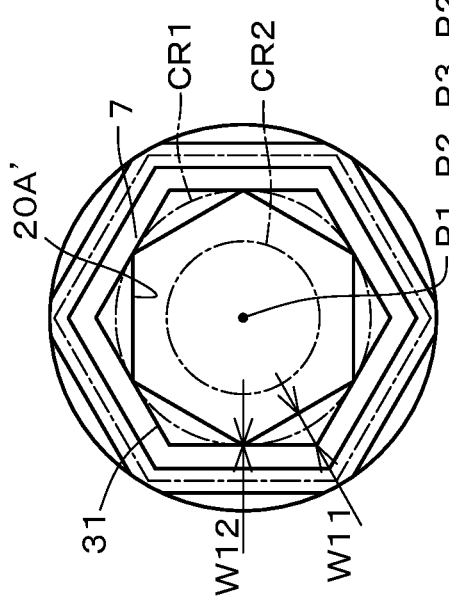

As illustrated in FIG. 16, shapes A and B (Present Disclosure Examples 1 and 2) had the dodecagonal annular end part 20B. Shape C (Comparative Example 1) had a hexagonal annular end part 20A'. The respective apexes of the annular end part 20A' were disposed on the corresponding midpoints of the six sides of the first ridge line 31. According to this configuration, the center width W12 was zero mm. The annular end part 20A of shape D (Present Disclosure Example 3) was arranged similarly to the first ridge line 31 in plan view.

Figure 17:
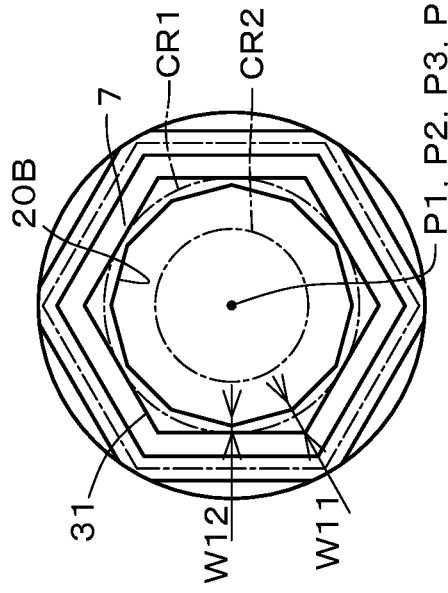
FIG. 17 is a schematic plan view illustrating shapes E to H with respect to an annular end part.
Figure 17:
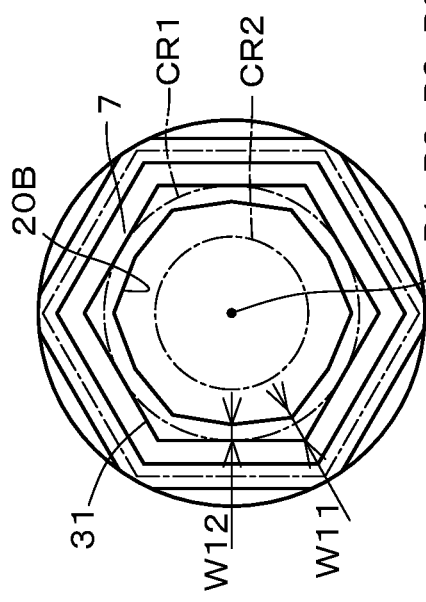
Figure 17:
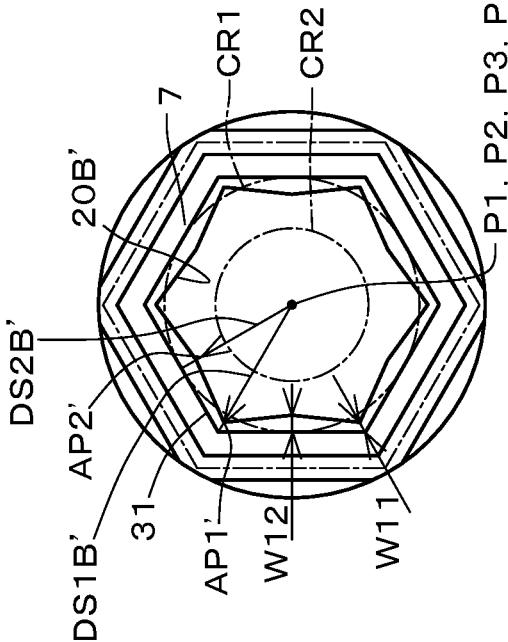
Figure 17:
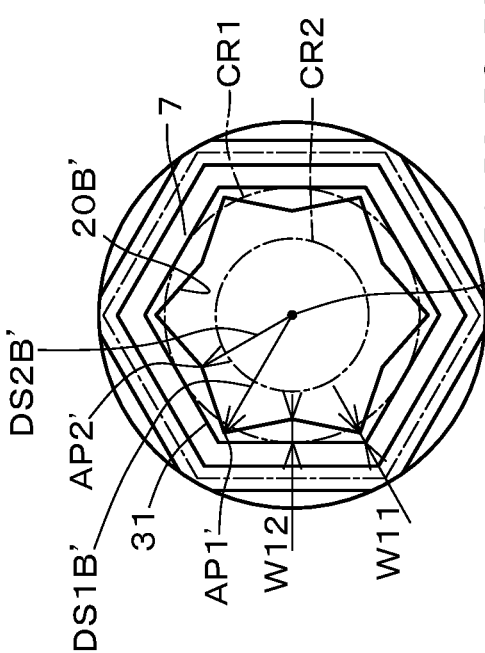

As illustrated in FIG. 17, shapes E and F (Present Disclosure Examples 4 and 5) had the dodecagonal annular end part 20B. Shapes G and H (Comparative Examples 2 and 3) had a dodecagonal annular end part 20B'. In the annular end part 20B', there were apexes AP1' which were adjacent to the apexes of the first ridge line 31, and apexes AP2' which were adjacent to the midpoints of the first ridge line 31. Further, a distance DS2B' from the center point P3 of the hexagonal first ridge line 31 to each apex AP2' was less than a distance DS1B' from the center point P3 to each apex APP. Furthermore, in the shapes G and H, one part of the annular end part 20B' was located on the outer side of the first circle CR1. In addition, in the shapes G and H, the corner width W11 was less than the center width W12 (W11<W12).

Figure 18:
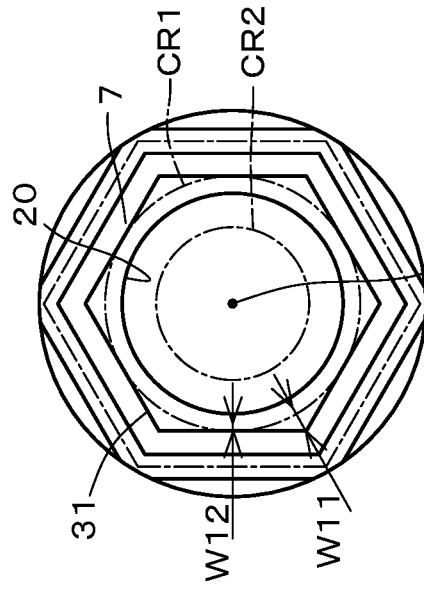
FIG. 18 is a schematic plan view illustrating shapes I, J and K with respect to an annular end part.
Figure 18:
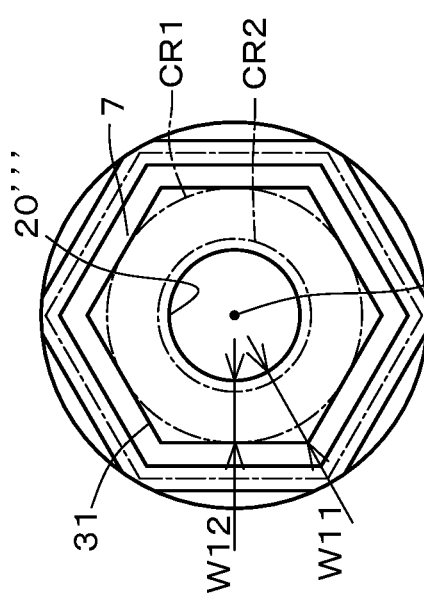
Figure 18:
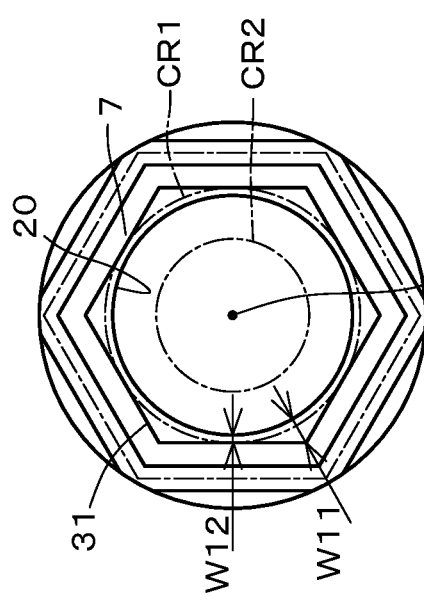

As illustrated in FIG. 18, shapes I, J and K (Present Disclosure Examples 6 and 7 and Comparative Example 4) had the circular annular end part 20. In the shape K (Comparative Example 4), the annular end part 20''' was located on the inner side of the second circle CR2. In each of Present Disclosure Examples 1 to 7, the corresponding annular end part 20, 20A or 20B was located between the first circle CR1 and the second circle CR2, and the width W1 of the upper face 11b of the floor 11 was 2 mm or more.

In the CAE analysis, a point C1 (see FIG. 3) on the center position of the unit 7, which is the weakest part of the panel 2, was set as a load point, and a predetermined load P was applied to this load point. The results were used as the evaluations of the panel rigidity and the dent resistance.

[Panel Rigidity Evaluation Conditions]

The load P was set to 49 N when evaluating the panel rigidity. If the maximum value of the deflection of the panel 2 when 49 N was applied was less than 1.8 mm, the relevant example was evaluated as "excellent", if the maximum value was less than 2.0 mm, the example was evaluated as "good", and if the maximum value was 2.0 mm or more, the example was evaluated as "poor".

[Dent Resistance Evaluation Conditions]

The load P was set to 245 N when evaluating the dent resistance. If the maximum value of the plastic deformation amount of the panel 2 when 245 N was applied was less than 0.23 mm, the relevant example was evaluated as "excellent", if the maximum value was less than 0.35 mm, the example was evaluated as "good", and if the maximum value was 0.35 mm or more, the example was evaluated as "poor".

The evaluation results for panel rigidity and dent resistance, respectively, are shown in Table 1.

TABLE 1

| Shape of Annular End Part 20 etc. | Length of One Side of First Ridge Line 31 (mm) | Corner Width W11 (mm) | Center Width W12 (mm) | Panel Rigidity | Dent Resistance | Weight of Reinforcing Member 3 | Remarks |
|---|---|---|---|---|---|---|---|
| A(Substantially Dodecagonal Shape) | 51 | 15 | 7.5 | excellent | good | 3.2 kg | Present Disclosure Example 1 |
| B(Substantially Dodecagonal Shape) | 51 | 15 | 5 | excellent | good | 3.1 kg | Present Disclosure Example 2 |

TABLE 1-continued

| Shape of Annular End Part 20 etc. | Length of One Side of First Ridge Line 31 (mm) | Corner Width W11 (mm) | Center Width W12 (mm) | Panel Rigidity | Dent Resistance | Weight of Reinforcing Member 3 | Remarks |
|---|---|---|---|---|---|---|---|
| C(Substantially Hexagonal Shape) | 51 | 14.25 | 0 | good | poor | 3.1 kg | Comparative Example 1 |
| D(Substantially Hexagonal Shape) | 51 | 11.55 | 10 | good | good | 3.1 kg | Present Disclosure Example 3 |
| E(Substantially Dodecagonal Shape) | 51 | 10 | 5 | good | excellent | 3.0 kg | Present Disclosure Example 4 |
| F(Substantially Dodecagonal Shape) | 51 | 10 | 2.5 | good | good | 3.0 Kg | Present Disclosure Example 5 |
| G(Substantially Dodecagonal Shape) | 51 | 5 | 10 | good | poor | 3.1 Kg | Comparative Example 2 |
| H(Substantially Dodecagonal Shape) | 51 | 5 | 7.5 | poor | poor | 3.0 Kg | Comparative Example 3 |
| I(Substantially Circular Shape) | 51 | 10 | 2 | good | good | 2.9 Kg | Present Disclosure Example 6 |
| J(Substantially Circular Shape) | 51 | 14 | 6 | excellent | good | 3.1 Kg | Present Disclosure Example 7 |
| K(Substantially Circular Shape) | 51 | 26 | 18 | excellent | poor | 3.6 Kg | Comparative Example 4 |

As shown in Table 1, for Comparative Example 1, because the center width W12 was zero, a support span of the panel 2 that could secure the panel rigidity was realized, however, because the deflection of the panel 2 was too large, the dent resistance was evaluated as "poor". Further, in Comparative Examples 2 and 3, one part of the annular end part 20A' was disposed outside the first circle CR1. Therefore, the distance between the point of action of the load P and the annular end part 20B' (constraint position) became too long. As a result, localized stress arose at the point of action of the load P, and consequently a stress state that was more than the yield load of the panel 2 was liable to occur and a dent was liable to occur. That is, the dent resistance was evaluated as "poor". With regard to Comparative Example 3, the panel rigidity of the panel 2 was also evaluated as "poor". With regard to Comparative Example 4 the annular end part 20''' was disposed inside the second circle CR2, and the support span of the panel 2 was short. Therefore, although the panel rigidity of the panel 2 was evaluated as "excellent", localized stress arose at the point of action of the load P, and as a result the dent resistance was evaluated as "poor".

On the other hand, with regard to Present Disclosure Examples 1 to 7, because the annular end parts 20, 20A and 20B were set to appropriate values, the support span of the panel 2 was appropriate, and the tension of the panel 2 could be sufficiently maintained and moderate deflection of the panel 2 was allowed. As a result, a favorable result ("good" or better) was obtained with respect to both the panel rigidity and the dent resistance. In particular, in Present Disclosure Examples 1 and 2, a very favorable result ("excellent") was obtained for panel rigidity, while also obtaining a favorable result ("good") for dent resistance. Further, in Present Disclosure Example 4, a very favorable result ("excellent") was obtained for dent resistance, while also obtaining a favorable result ("good") for panel rigidity. Furthermore, in Present Disclosure Example 7, a very favorable result ("excellent") was obtained for panel rigidity, while also obtaining a favorable result ("good") for dent resistance.

Note that, as described above, with respect to the panel 2 made of a steel sheet and the reinforcing member 3 made of a steel sheet, and the panel 2 made of an aluminum alloy sheet and the reinforcing member 3 made of an aluminum alloy sheet, by setting the respective sheet thicknesses of these components to thicknesses such that the respective performances thereof from the viewpoint of panel rigidity and dent resistance are equivalent, similar panel rigidity and dent resistance can be secured. Therefore, it is clear that similar advantageous effects can also be obtained when the present invention is applied to an aluminum alloy sheet.

Industrial Applicability

The present disclosure can be widely applied as an automobile hood.

REFERENCE SIGNS LIST

1 Automobile Hood
2 Panel
3 Reinforcing Member
4 Joint
7 Unit
11 Floor
11b Upper Face (Floor Surface)
12 Inclined wall
13 Top Plate
20, 20A, 20B Annular End Part
31 First Ridge Line (Hexagonal Annular Ridge Line)
CR1 First Circle
CR2 Second Circle
t1 Sheet Thickness of Panel
W1 Width of Upper Face (Width of Floor Surface)
W11 Corner Width (Distance Between Corner of Hexagonal Ridge Line and Annular End Part)
W12 Center Width (Distance Between Center of One End of Ridge Line and Annular End Part)

The invention claimed is:

1. An automobile hood, comprising:
   a panel,
   a reinforcing member, and
   a joint that joins together the panel and the reinforcing member,
   wherein:
   the reinforcing member includes a structure formed from a plurality of units having a hexagonal annular shape disposed in a close-packed arrangement;
   the unit has a floor, an inclined wall, and a top plate;
   the floor is adjacent to the panel;
   the top plate and the panel are separated from each other;
   the inclined wall is between the floor and the top plate;
   a hexagonal annular ridge line of the unit is between the floor and the inclined wall;
   the floor has an annular end part which is centered on a center of the annular unit;
   all of the end part is between a first circle which is inscribed within the ridge line, and a second circle which is concentric with the first circle and which has a radius that is 60% of a radius of the first circle;
   the floor includes a floor surface as a face which faces the panel; and
   a width of the floor surface is 2 mm or more over an entire area of the annular end part in a circumferential direction of the annular end part.

2. The automobile hood according to claim 1, wherein:
   a distance between a corner of the hexagonal ridge line and the annular end part is greater than a distance between a center of one side of the ridge line and the annular end part.

3. The automobile hood according to claim 1, wherein:
   the end part is circular.

4. The automobile hood according to claim 1, wherein:
   the end part is hexagonal.

5. The automobile hood according to claim 1, wherein:
   the end part is dodecagonal.

6. The automobile hood according to claim 1, wherein:
   the panel is a steel sheet, and
   a sheet thickness of the panel is within a range of 0.35 mm to 0.60 mm.

7. The automobile hood according to claim 1, wherein:
   the panel is an aluminum alloy sheet, and
   a sheet thickness of the panel is within a range of 0.50 mm to 1.00 mm.

* * * * *